(12) United States Patent
Morooka

(10) Patent No.: US 9,361,056 B2
(45) Date of Patent: Jun. 7, 2016

(54) INFORMATION PROCESSING APPARATUS AND METHOD FOR GENERATING A CONFLICT CONFIRMATION PRINT JOB

(75) Inventor: Hidekazu Morooka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 854 days.

(21) Appl. No.: 13/254,824

(22) PCT Filed: Apr. 12, 2011

(86) PCT No.: PCT/JP2011/002152
§ 371 (c)(1),
(2), (4) Date: Sep. 2, 2011

(87) PCT Pub. No.: WO2011/138848
PCT Pub. Date: Nov. 10, 2011

(65) Prior Publication Data
US 2012/0013948 A1    Jan. 19, 2012

(30) Foreign Application Priority Data
May 6, 2010   (JP) ................................ 2010-106214

(51) Int. Cl.
*G06F 3/12*   (2006.01)
(52) U.S. Cl.
CPC ............ *G06F 3/1285* (2013.01); *G06F 3/1203* (2013.01); *G06F 3/1255* (2013.01)
(58) Field of Classification Search
None
See application file for complete search history.

(56) References Cited

U.S. PATENT DOCUMENTS

| 7,057,747 | B1* | 6/2006 | Minagawa ................... 358/1.13 |
| 7,159,190 | B2* | 1/2007 | Perry .................... G06F 3/1205 |
| | | | 399/81 |
| 7,218,976 | B2 | 5/2007 | Minagawa |
| 7,538,902 | B2 | 5/2009 | Kurotsu |
| 7,609,400 | B2 | 10/2009 | Kuroda |
| 7,633,637 | B2 | 12/2009 | Fujimoto |
| 7,719,703 | B2 | 5/2010 | Kurotsu |
| 7,804,607 | B2 | 9/2010 | Tomita |
| 7,821,657 | B2* | 10/2010 | Ferlitsch ..................... 358/1.13 |
| 7,839,510 | B2* | 11/2010 | Kizaki et al. ................ 358/1.13 |
| 7,839,516 | B2 | 11/2010 | Tomita |
| 7,916,332 | B2* | 3/2011 | Kato ........................... 358/1.15 |
| 8,390,837 | B2* | 3/2013 | Morooka .................... 358/1.14 |
| 2002/0161936 | A1 | 10/2002 | Minagawa |
| 2005/0162667 | A1* | 7/2005 | Felix et al. .................... 358/1.1 |

(Continued)

FOREIGN PATENT DOCUMENTS

| JP | 4-220366 | 8/1992 |
| JP | 2002-328787 | 11/2002 |

(Continued)

*Primary Examiner* — Paul F Payer
(74) *Attorney, Agent, or Firm* — Fitzpatrick, Cella, Harper & Scinto

(57) ABSTRACT

A client computer 1 performs a first print setting for each second page range included in a first page range to be subjected to print processing, generates a conflict confirmation job in which an execution result is used for executing conflict processing for detecting the combinations of print settings for which the network printer 3 is incapable of executing print processing, based on the first print setting, and transmits the conflict confirmation job to the network printer 3. The client computer 1 receives an execution result of the conflict confirmation job from the network printer 3, and executes conflict processing based on the execution result of the received conflict confirmation job.

10 Claims, 18 Drawing Sheets

(56) References Cited

U.S. PATENT DOCUMENTS

| | | | |
|---|---|---|---|
| 2006/0082802 A1* | 4/2006 | Furuya | 358/1.13 |
| 2006/0203283 A1 | 9/2006 | Fujimoto | |
| 2007/0146808 A1* | 6/2007 | Kudo et al. | 358/448 |
| 2007/0268513 A1* | 11/2007 | Enloe | 358/1.15 |
| 2007/0296995 A1* | 12/2007 | Sakura | 358/1.13 |
| 2008/0106755 A1 | 5/2008 | Morooka | |

FOREIGN PATENT DOCUMENTS

| | | |
|---|---|---|
| JP | 2006-252480 | 9/2006 |
| JP | 2006-327016 | 12/2006 |

* cited by examiner

Fig. 9A

| PAGE NUMBER | GLOBAL SETTING | EXCEPTION SETTING 1 | EXCEPTION SETTING 2 | OVERLAP SETTING COUNTER |
|---|---|---|---|---|
| 1 | PUNCHING | | | 0 |
| 2 | PUNCHING | | | 0 |
| 3 | PUNCHING | | | 0 |
| 4 | PUNCHING | | | 0 |
| 5 | PUNCHING | | FOLDING | 1 |
| 6 | PUNCHING | | FOLDING | 1 |
| 7 | PUNCHING | STAPLING | FOLDING | 2 |
| 8 | PUNCHING | STAPLING | FOLDING | 2 |
| 9 | PUNCHING | STAPLING | | 1 |
| 10 | PUNCHING | STAPLING | | 1 |
| 11 | PUNCHING | | | 0 |
| 12 | PUNCHING | | | 0 |
| 13 | PUNCHING | | | 0 |

Fig. 9B

| PAGE NUMBER | GLOBAL SETTING | EXCEPTION SETTING 1 | EXCEPTION SETTING 2 | OVERLAP SETTING COUNTER |
|---|---|---|---|---|
| 1 | PUNCHING | | | 0 |
| 2 | PUNCHING | | | 0 |
| 3 | PUNCHING | | | 0 |
| 4 | PUNCHING | | | 0 |
| 5 | PUNCHING | | FOLDING | 1 |
| 6 | PUNCHING | | FOLDING | 1 |
| 7 | PUNCHING | | | 0 |
| 8 | PUNCHING | | | 0 |
| 9 | PUNCHING | STAPLING | | 1 |
| 10 | PUNCHING | STAPLING | | 1 |
| 11 | PUNCHING | | | 0 |
| 12 | PUNCHING | | | 0 |
| 13 | PUNCHING | | | 0 |

Fig. 18

| PAGE NUMBER | GLOBAL SETTING | EXCEPTION SETTING 1 | EXCEPTION SETTING 2 | EXCEPTION SETTING 3 | OVERLAP SETTING COUNTER | OVERLAP FLAG |
|---|---|---|---|---|---|---|
| 1 | PUNCHING | | | | 0 | |
| 2 | PUNCHING | | | | 0 | |
| 3 | PUNCHING | STAPLING | | | 1 | |
| 4 | PUNCHING | STAPLING | | | 1 | |
| 5 | PUNCHING | STAPLING | | | 1 | |
| 6 | PUNCHING | | | FOLDING | 1 | |
| 7 | PUNCHING | | | FOLDING | 1 | |
| 8 | PUNCHING | | | FOLDING | 1 | |
| 9 | PUNCHING | | STAPLING | | 1 | ✓ |
| 10 | PUNCHING | | STAPLING | | 1 | ✓ |
| 11 | PUNCHING | | STAPLING | | 1 | ✓ |
| 12 | PUNCHING | | | | 0 | |
| 13 | PUNCHING | | | | 0 | |

INFORMATION PROCESSING APPARATUS AND METHOD FOR GENERATING A CONFLICT CONFIRMATION PRINT JOB

TECHNICAL FIELD

The present invention relates to an information processing apparatus, a method for controlling the same, and a storage medium.

BACKGROUND ART

A print control apparatus that transmits a print job to which print settings have been added to a printer to cause the printer to execute print processing corresponding to the print settings has been proposed. Here, a conflict may occur for the print settings set by the print control apparatus. The occurrence of a conflict means the occurrence of a discrepancy between the print settings. An example of such a conflict is that a printer cannot execute print processing for the combination of print settings made with respect to a page range to be subjected to print processing.

Japanese Patent Laid-Open No. 2002-32878 discloses a control device that performs processing to avoid a discrepancy between the pre-registered print settings using a module for avoiding the same when a conflict occurs for the print settings. With the aid of the control device, the module for data to be input via a user interface may be employed for processing for avoiding a discrepancy between data to be input without the intermediary of a user interface and alignment processing for all data in a shared manner.

In the commercial printing system workflow such as POD (Print On Demand) or the like, accommodation for a huge number of sheet types and sheet sizes is essential. Also, in a print control apparatus, the combination patterns of print settings have been increasing due to diversification of items for which print settings can be made. For example, in addition to a global setting, that is, a print setting that is common to all of the pages to be subjected to print processing, a print control apparatus may also set a print setting (exception setting), which is different from the global setting, for a specified page range.

As disclosed in Japanese Patent Laid-Open No. 2002-32878, when processing for avoiding a discrepancy between the pre-registered print settings is performed using a module for avoiding the same, the following problems may occur:

(1) Processing for avoiding a discrepancy between print settings may differ for each type of printer. Thus, when printers of a plurality of types are employed, a print control apparatus needs to be provided with a module for avoiding a discrepancy between print settings for each type of printer. However, since the specifications differ between these types of printers, processing for avoiding a discrepancy between print settings performed by the print control apparatus may become inconsistent.

(2) With an increase in the combination patterns of print setting, the development of a module, which is compatible with a plurality of types of printers and avoids any discrepancies between print settings, requires many man-hours.

(3) When the combinations of print settings become enormous, some processing procedures performed by a module for avoiding a discrepancy between print settings may be omitted. Thus, a discrepancy between print settings, which must be avoided, may not be avoided.

(4) Since some print control apparatuses need to accommodate an enormous number of combination patterns of print settings, a specification omission such as the fact that processing for avoiding discrepancy is not performed for a certain part of print settings may occur.

SUMMARY OF INVENTION

The information processing apparatus of the present invention readily detects a discrepancy between the print settings without including a module to avoid a discrepancy between the print settings that depend on the type of the printing device.

According to an aspect of the present invention, an information processing apparatus is provided that transmits a print job to which a print setting has been added to a printing device to cause the printing device to execute print processing corresponding to the print setting. The information processing apparatus includes a print setting unit configured to perform a first print setting for each of one or a plurality of second page ranges included in a first page range to be subjected to the print processing; a conflict confirmation job generating unit configured to generate a conflict confirmation job, which is a print job, in which an execution result is used for conflict processing for detecting the combinations of print settings by which the printing device is incapable of executing print processing, based on the first print setting; a job transmitting unit configured to transmit the generated conflict confirmation job to the printing device to cause the printing device to execute the conflict confirmation job; a job execution result receiving unit configured to receive an execution result of the conflict confirmation job from the printing device; and a conflict processing executing unit configured to execute the conflict processing based on the execution result of the received conflict confirmation job.

Further features of the present invention will become apparent from the following description of exemplary embodiments with reference to the attached drawings.

BRIEF DESCRIPTION OF DRAWINGS

FIG. 9A is a diagram illustrating an example of an exception setting table.

FIG. 9B is a diagram illustrating an example of an exception setting table.

FIG. 18 is a diagram illustrating an example of an exception setting table.

DESCRIPTION OF EMBODIMENTS

Figure 1:
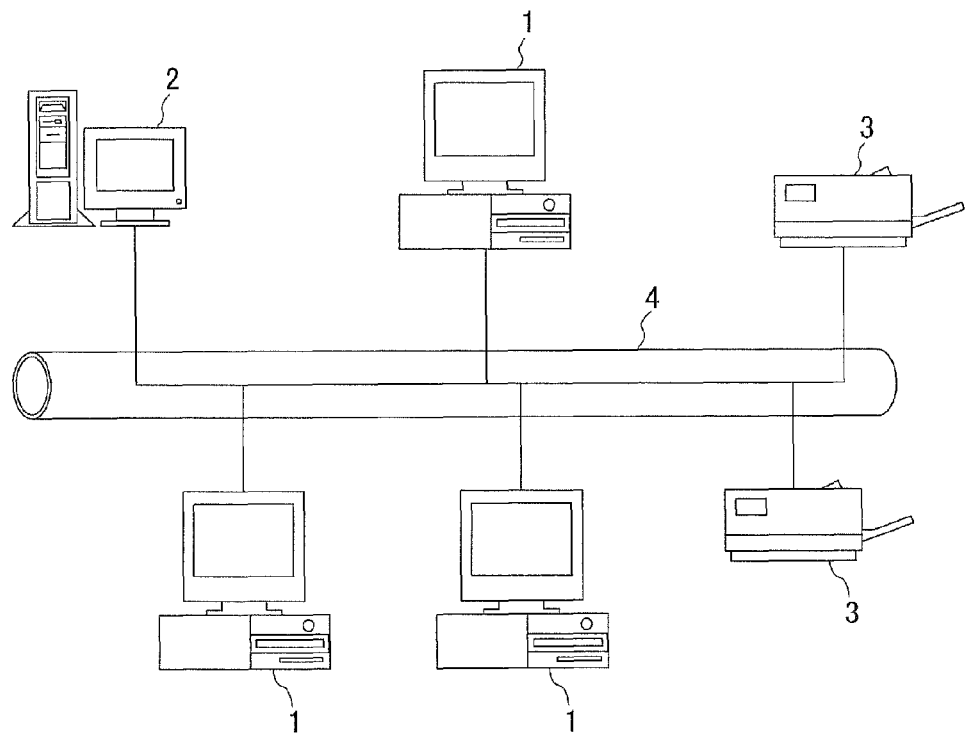
FIG. 1 is a diagram illustrating an example of the system configuration of the present embodiment.

FIG. 1 is a diagram illustrating an example of the system configuration of the present embodiment. The system shown in FIG. 1 includes a plurality of client computers 1, a print server 2, and a plurality of network printers 3. The system of the present embodiment may include any number of the client computers 1, the print servers 2, and the network printers 3. The client computers 1, the printer server 2, and the network printers 3 are connected to a network 4 via a network cable such as Ethernet (registered trademark) or the like.

The client computer 1 is the information processing apparatus of the present embodiment. The client computer 1 transmits a print job to which a print setting has been added to the printer 3 via the print server 2, and causes the printer 3 to execute print processing corresponding to the print setting. Also, the client computer 1 receives an execution result of the print processing performed by the printer 3 from the printer 3 via the print server 2. For this purpose, the client computer 1 can execute various type of programs such as an application program and the like. Furthermore, a printer driver, which has a function of converting print data into a printer language corresponding to the network printer 3, is installed on the client computer 1. Note that the client computer 1 can register a plurality of printer drivers.

The print server 2 accumulates files used in the network 4, or monitors the usage state of the network 4. The print server 2 manages a plurality of the network printers 3 connected to the network 4. More specifically, the print server 2 receives a print job from the client computer 1, and stores the print job in a storage medium. Then, the print server 2 transmits the print job stored in the storage medium to the network printer 3 for execution. Also, the print server 2 acquires a variety of information relating to a print job, such as the execution result of a print job by the network printer 3, a job status, and the like from the network printer 3, and notifies the client computer 1 about the acquired information. Note that the client computer 1 and the print server 2 can be configured by a typical information processing apparatus that stores print control programs, each of which performs different control, in an executable manner. When a typical information processing apparatus is employed for the print server 2, the print server 2 may also have the functions of the client computer 1.

The network printer 3 is a printing device. The network printer 3 may be any printing device that performs printout in various ways, such as a laser beam printer, an inkjet printer, a digital complex machine, and the like. The network printer 3 is connected to the network 4 via a network interface. The network printer 3 receives a print job from the client computer 1 via the print server 2. The network printer 3 analyzes the received print job. When the print job includes print data, the network printer 3 converts print data into dot image for each page. Then, the network printer 3 prints the print data that has been converted into dot image data for each page (executes the print job). Note that the network printer 3 can provide the print job management function defined in ISO 10175 (DPA) to either one of the print server 2 or the client computer 1, where DPA is an abbreviation for Document Printing Application.

The network 4 communicably connects the client computer 1, the print server 2, and the network printer 3 with each other. The network 4 is realized by, for example, an Internet, LAN (Local Area Network), or the like.

Figure 2A:
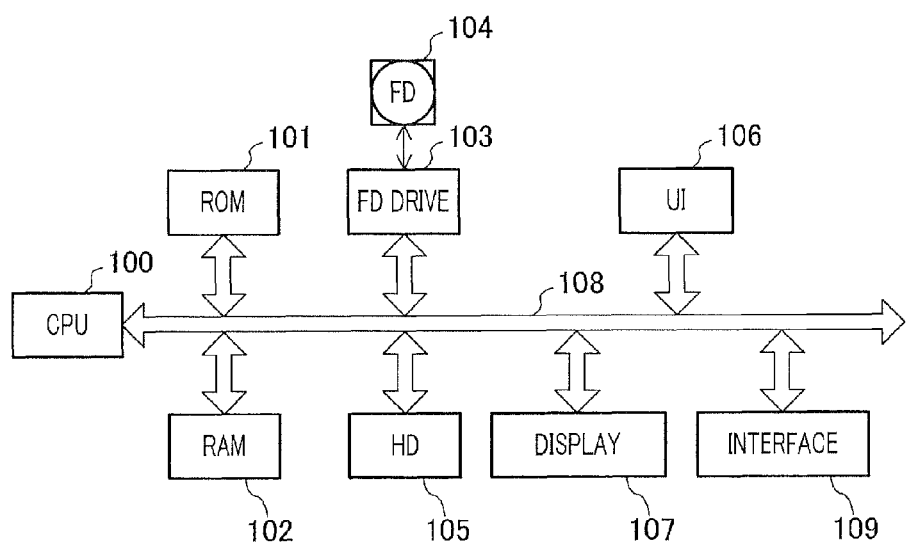
FIG. 2A is a diagram illustrating an example of the hardware configuration of a client computer.

FIG. 2A is a diagram illustrating an example of the hardware configuration of the client computer shown in FIG. 1. Note that the hardware configuration of the print server 2 is the same as that of the client computer 1. A CPU 100 shown in FIG. 2A controls the entire client computer 1. The CPU 100 executes programs stored in a HD 105 and the like, where HD is an abbreviation for Hard Disk. The programs stored in the HD 105 and the like include, for example, an application program, a printer driver program, an OS, a network printer control program, and the like, where OS is an abbreviation for Operating System. A network printer control program includes, for example, a program that controls an instruction given by the client computer 1 about where a print job is to be printed. Also, in the print server 2, a network printer control program includes, for example, a program that is used by the print server 2 for providing a notification about a print end of a print job, a change request for changing where a print job is to be printed, and the like. Hereinafter, a network printer control program is described as a print control program. Further, when the CPU 100 is executing the program, the CPU 100 carries out control such that information, files, and the like required for executing the program are temporarily stored in a RAM 102, where RAM is an abbreviation for Random Access Memory.

A ROM 101 is a storage medium that stores a program such as a basic I/O program and the like and various data such as font data, template data, and the like to be used upon document processing, where ROM is an abbreviation for Read Only Memory and I/O is an abbreviation for Input/Output. The RAM 102 is a storage medium that temporarily stores data, and functions as a main memory, a work area, and the like for the CPU 100.

A FD driver 103 is a drive that is used for loading programs and the like stored in a flexible disk (FD) 104 as a storage medium in the client computer 1, where FD is an abbreviation for Flexible Disk. A print control program is stored in the FD 104. Note that the storage medium is not limited to a FD. Instead of a FD, any storage medium such as a CD-ROM, a CD-R, a CD-RW, a PC card, a DVD, an IC memory card, an MO, a memory stick, and the like may be employed.

The HD 105 is one of the external storage devices, and functions as a large-capacity memory. An application program, a printer driver program, an OS, a network printer control program, a relevant program, and the like are stored in the HD 105. Also, a client spooler is stored in the HD 105. In the print server 2, a server spooler is stored in the HD 105. In the print server 2, information about the received print job from the client computer 1 and information to be used for controlling the print order are further stored in the HD 105.

A UI (User Interface) 106 is a user interface that is used for a user's instruction input. The UI 106 includes, for example, a keyboard and a mouse. When a user operates the keyboard and the mouse, the UI 106 inputs a control command and the like for instructing the network printer 3 to the information processing apparatuses (the client computer 1 and the print server 2).

A display 107 displays the control command input by the UI 106, the state of the network printer 3, and the like. The display 107 includes, for example, a LCD (Liquid Crystal Display). A system bus 108 is a transmission path for data in the client computer 1. An interface 109 connects the client computer 1 to the network 4. The client computer 1 can receive/transmit data between external devices via the interface 109. Note that the client computer 1 may include software, which realizes the functions equivalent to those provided by the processing sections shown in FIG. 2A, as an alternative to the processing sections (this likewise applies to the print server 3).

Figure 2B:
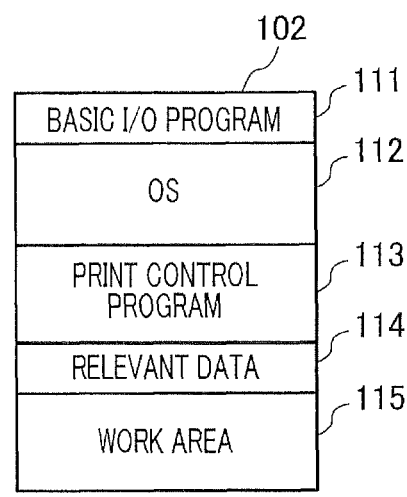
FIG. 2B is a diagram illustrating an example of the memory map of RAM.

FIG. 2B is a diagram illustrating an example of the memory map of RAM shown in FIG. 2A. The print control program stored in the FD 104 can be executed by being loaded into the RAM 102. FIG. 2B shows the memory map of the RAM 102 in the state where the print control program is executable.

The RAM 102 stores a basic I/O program 111, an OS 112, a print control program 113, a relevant data 114, and a work area 115. The basic I/O program 111 includes a program having an IPL (Initial Program Loading) function, or the like to develop the OS from the HD 105 to the RAM 102 to thereby start the operation of the OS when the power source of the client computer 1 is turned ON. The OS 112, the print control program 113, and the relevant data 114 are respectively stored in the secured areas of the RAM 102. The work area 115 is a work area to be utilized when the CPU 100 executes the print control program 113 and the like.

While the present embodiment shows an example in which the CPU 100 loads the print control program and the relevant data from the FD 104 directly to the RAM 102 for execution, such a configuration may not always be necessary. For example, the CPU 100 may load the print control program from the HD 105, on which the print control program has already been installed, to the RAM 102.

Also, a storage medium storing the print control program 113 is not limited to the FD 104, but may be a CD-ROM, a CD-R, a PC card, a DVD, an IC memory card, or the like. Furthermore, it is also possible that the CPU 100 stores the print control program 113 in the ROM 101 and this is configured to become a part of the memory map so that the CPU 100 directly executes the print control program 113.

Figure 2C:
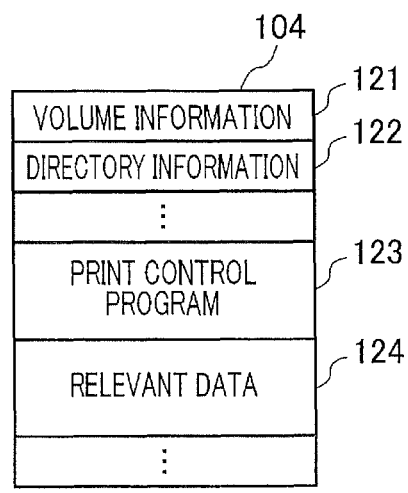
FIG. 2C is a diagram illustrating an example of the memory map of an FD.

FIG. 2C is a diagram illustrating an example of the memory map of an FD shown in FIG. 2A. The FD 104 stores volume information 121, directory information 122, a print control program 123, and a relevant data 124. The print control program 123 is loaded as the print control program 113 shown in FIG. 2B to the RAM 102.

Figure 3:
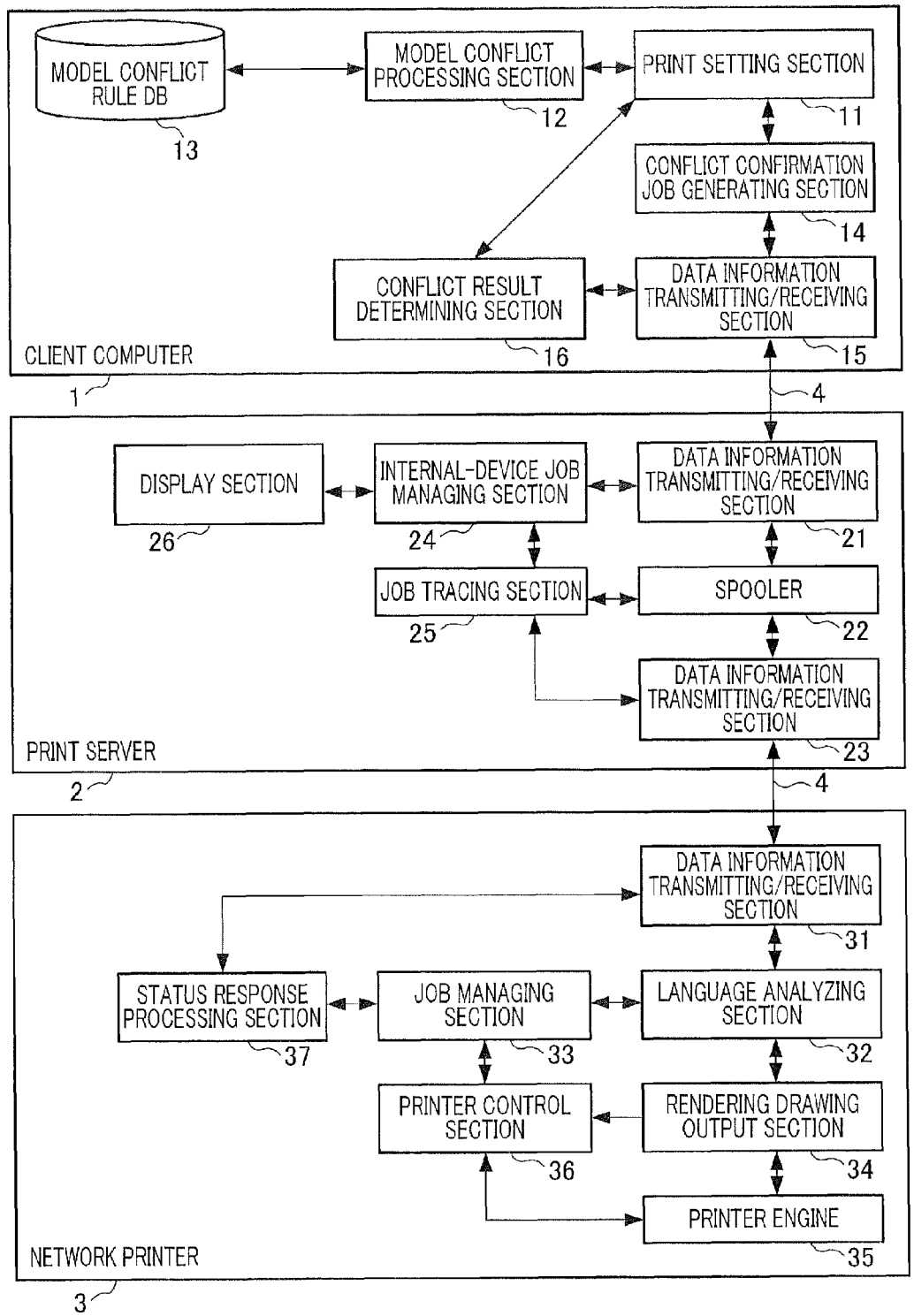
FIG. 3 is an exemplary functional block diagram illustrating the system of the present embodiment.

FIG. 3 is an exemplary functional block diagram illustrating the system of the present embodiment. As shown in FIG. 3, the client computer 1 includes a print setting section 11, a model conflict processing section 12, and a model conflict rule DB (Data Base) 13. The client computer 1 further includes a conflict confirmation job generating section 14, a data information transmitting/receiving section 15, and a conflict result determining section 16.

The print setting section 11 inputs a print setting to be added to a print job. For example, the print setting section 11 passes the print setting input via a predetermined user interface to the model conflict processing section 12. Examples of print setting include the number of copies to print, stapling, folding, punching, and the like. Also, the print setting section 11 receives the result of model conflict processing, which has been executed for the print setting by the model conflict processing section 12, and performs processing corresponding to the model conflict processing result. The model conflict processing is processing that detects logically-unmatched print setting such as a print setting for performing a duplex print on an OHP sheet, or the like. The model conflict processing is commonly applicable regardless of the type of the network printer 4. When the result of model conflict processing executed by the model conflict processing section 12 indicates that a logically-unmatched print setting has been detected, the print setting section 11 invalidates the print setting.

Also, the print setting section 11 receives the result of conflict processing executed by the conflict result determining section 16 from the conflict result determining section 16, and performs processing corresponding to the conflict processing result. The conflict processing is processing that detects the combinations of print settings for which the network printer 3 is incapable of executing print processing. The conflict processing is executed based on the execution result of the conflict confirmation job received by the data information transmitting/receiving section 15 from the network printer 3. When the conflict processing result indicates that the combinations of print settings for which the network printer 3 is incapable of executing print processing have been detected, the print setting section 11 displays the combinations of print settings on a predetermined display screen.

Also, among the print settings input via a user interface, the print setting section 11 passes the print setting, which has not been detected as a logically-unmatched print setting by model conflict processing, to the conflict confirmation job generating section 14. Further, when the conflict processing result indicates that the combinations of print settings for which the network printer 3 is incapable of executing print processing have not been detected, the print setting section 11 executes the following processing. The print setting section 11 generates a print job that includes the print setting which has not been detected as a logically-unmatched print setting by model conflict processing, and the content corresponding to the respective pages to which the print setting is applied. The content is a content including print data which a user originally wishes to cause the network printer 3 to print. The print setting section 11 transmits the generated print job to the network printer 3 via the data information transmitting/receiving section 15 and the print server 2.

The model conflict processing section 12 executes model conflict processing for the print setting, which has been passed from the print setting section 11, using a model conflict rule in the model conflict rule DB 13. The model conflict rule is a rule that determines a logically-unmatched print setting. The model conflict rule DB 13 stores the model conflict rule in advance.

The conflict confirmation job generating section 14 functions as a conflict confirmation job generating unit configured to generate a conflict confirmation job based on the print setting passed from the print setting section 11. The conflict confirmation job is a print job that employs the execution result for conflict processing. The data information transmitting/receiving section 15 transmits a conflict confirmation job to the network printer 3 via the print server 2, and causes the network printer 3 to execute the conflict confirmation job. More specifically, the data information transmitting/receiving section 15 functions as a job transmitting unit configured to transmit a conflict confirmation job to a printing device and cause the printing device to execute the conflict confirmation job.

Also, the data information transmitting/receiving section 15 functions as a job execution result receiving unit configured to receive the execution result of the conflict confirmation job executed by the network printer 3 from the data information transmitting/receiving section 21 provided in the print server 2. The data information transmitting/receiving section 15 passes the execution result of the received conflict confirmation job to the conflict result determining section 16. The conflict result determining section 16 functions as a conflict processing executing unit configured to execute conflict processing based on the execution result of the conflict confirmation job received from the data information transmitting/receiving section 15. The method for controlling the information processing apparatus of the present embodiment and its computer program are realized by the functions of the processing sections provided in the client computer 1 shown in FIG. 3.

The print server 2 shown in FIG. 3 includes data information transmitting/receiving sections 21 and 23, a spooler 22, an internal-device job managing section 24, a job tracing section 25, and a display section 26. The data information transmitting/receiving section 21 receives a print job (e.g., conflict confirmation job) from the data information transmitting/receiving section 15 provided in the client computer 1 and passes the print job to the spooler 22. The data information transmitting/receiving section 21 also receives the execution result of the conflict confirmation job by the network printer 3 from the internal-device job managing section 24, and passes the execution result to the data information transmitting/receiving section 15 provided in the client computer 1.

The spooler 22 receives a print job (e.g., conflict confirmation job) passed from the data information transmitting/receiving section 21, and transmits the print job to the data information transmitting/receiving section 31 provided in the network printer 3 via the data information transmitting/receiving section 23. The data information transmitting/receiving section 23 transmits the print job to the data information transmitting/receiving section 31 provided in the network printer 3 in accordance with an instruction given by the spooler 22. Also, the data information transmitting/receiving section 23 receives status response information from the data information transmitting/receiving section 31 provided in the network printer 3, and passes the status response information to the job tracing section 25. The status response information is information that indicates the state of a print job being executed by the network printer 3. Examples of status response information include the execution result of the conflict confirmation job by the network printer 3.

The internal-device job managing section 24 receives an instruction corresponding to a user's operation input using a GUI displayed on the display section 26, where GUI is an abbreviation for Graphical User Interface. The internal-device job managing section 24 transmits a control command such as cancellation, stop, or the like of a print job to the network printer 3 via the data information transmitting/receiving section 23 in accordance with the instruction. Also, the internal-device job managing section 24 receives status response information from the job tracing section 25, and passes the execution result of the conflict confirmation job included in the status response information to the data information transmitting/receiving section 21. Further, the internal-device job managing section 24 causes the display section 26 to display the status response information. The job tracing section 25 acquires the status response information from the data information transmitting/receiving section 23, and passes the status response information to the internal-device job managing section 24. The display section 26 performs display processing in accordance with an instruction given by the internal-device job managing section 24.

The network printer 3 shown in FIG. 3 includes a data information transmitting/receiving section 31, a language analyzing section 32, a job managing section 33, a rendering output section 34, a printer engine 35, a printer control section 36, and a status response processing section 37. The data information transmitting/receiving section 31 receives a print job from the data information transmitting/receiving section 23 provided in the print server 2, and passes the print job to the language analyzing section 32. As a function specific to the present embodiment, the data information transmitting/receiving section 31 receives a conflict confirmation job from the data information transmitting/receiving section 23 provided in the print server 2, and passes the conflict confirmation job to the language analyzing section 32. Also, the data information transmitting/receiving section 31 receives status response information from the status response processing section 37, and transmits the status response information to the data information transmitting/receiving section 23 provided in the print server 2.

The language analyzing section 32 analyzes data content included in the print job (e.g., conflict confirmation job) passed from the data information transmitting/receiving section 31, decodes a print command, and executes a control command regarding management, rendered output, and the like of the print job in accordance with the print command. More specifically, the language analyzing section 32 receives a group of control commands sequentially one by one from a receiving buffer provided within the data information transmitting/receiving section 31. Then, the language analyzing section 32 examines the content of the received control command in accordance with the description rule of a printer control language, and determines what kind of processing is requested by the control command. When the control command is a command regarding a print job or a command regarding the attribute of a print job as a result of a determination, the language analyzing section 32 issues the management command of the relevant print job to the job managing section 33. A command regarding a print job includes, for example, the declaration of the start/end of a print job, and the like. A command regarding the attribute of a print job includes a command corresponding to a print setting to which the print job has been added, such as sheet size, the number of prints, stapling, punching, and the like. When a control command provides an instruction about the rendered output of characters, graphics, images, and the like, the language analyzing section 32 issues a rendering output command based on the relevant print job to the rendering output section 34.

Depending on the attribute of a print job to be executed, the job managing section 33 issues a selection command (printer control command) of a sheet and a sheet ejection bin to be used to the printer control section 36. Also, the job managing section 33 acquires the state of a print job being currently executed from the printer control section 36. When a predetermined condition is established, such as when the execution of a print job has been completed, when an error has occurred during execution of a print job, or the like, the job managing section 33 issues a status response request instruction to the status response processing section 37. The status response request instruction is a control information that instructs the generation of status response information.

The rendering output section 34 performs rendering development of characters, graphics, images, and the like for print output. For example, the rendering output section 34 generates the relevant character pattern, performs graphic calculation, or performs expansion processing for image data in accordance with the rendering output command issued from the language analyzing section 32. Also, the rendering output section 34 develops print data into a data format suited for output, and passes the print data to the printer engine 35. Based on the print data passed from the rendering output section 34, the printer engine 35 actually forms an image on the plane of a sheet using a scheme such as an electro-photographic type or the like to thereby perform print output processing. Also, the printer engine 35 has a function that detects the remaining amount of recording sheets. For example, when a sheet required for print output processing is not set, the printer engine 35 sends out a warning signal to the printer control section 36. Or, for example, when a sheet is absent for expansion/print processing, the printer engine 35 stops a recording unit such as a printer drum, and sends out an error signal to the printer control section 36 by means of interruption or the like.

In accordance with the printer control command issued from the job managing section 33, the printer control section 36 controls the network printer 3 by selecting a sheet to be used, performing initialization of the network printer 3, or the like. More specifically, the printer control section 36 executes job processing corresponding to the print setting included in a print job. Also, the printer control section 36 always monitors information about a sheet feed cassette used during print execution, finishing information about punching, stapling, or saddling, information about a sheet ejection port from which a sheet has been discharged, and information about a sheet transport path such as the presence or absence of usage of an inversion path. When the execution of a print job has been completed, the printer control section 36 notifies the job managing section 33 about the execution result of the print job. A print job is executed by the functions from the data information transmitting/receiving section 31 to the printer control section 36 described above.

The status response processing section 37 generates status response information in accordance with the status response request instruction issued by the job managing section 33. When the network printer 3 executes a conflict confirmation job, the status response information includes the execution result of the conflict confirmation job. The status response processing section 37 passes the generated status response information to the data information transmitting/receiving section 31.

The data information transmitting/receiving section 31 receives the status response information from the status response processing section 37, and temporarily stores it in a transmitting buffer or the like. Also, the data information transmitting/receiving section 31 transmits the status response information temporarily stored in a transmitting buffer or the like to the data information transmitting/receiving section 23 provided in the print server 4.

Figure 4:
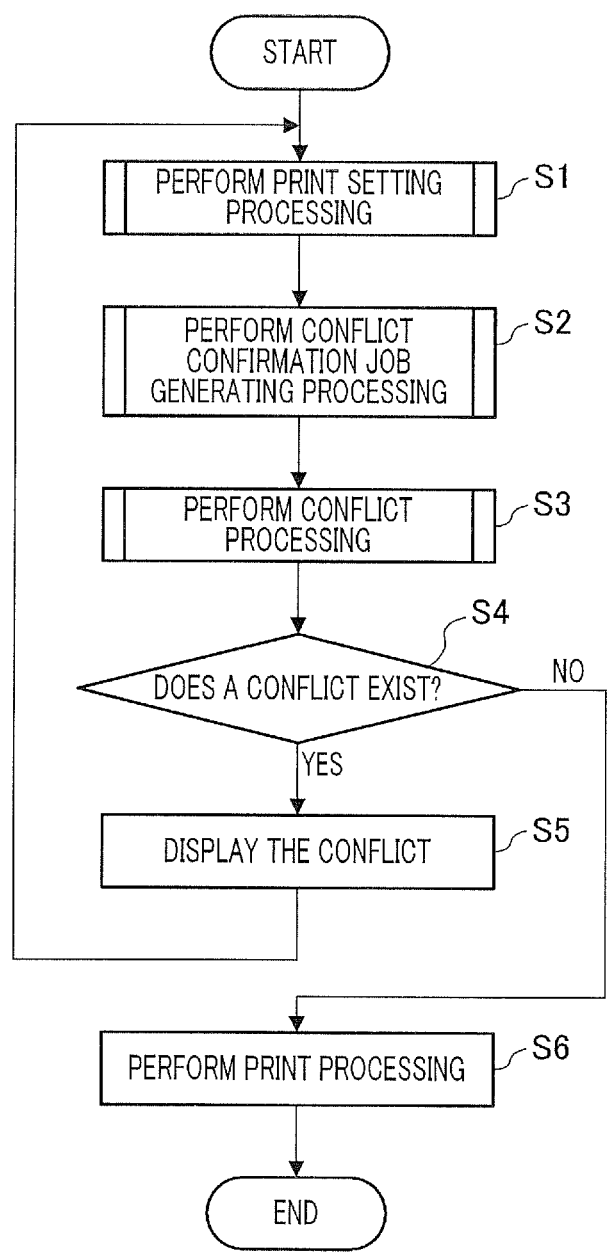
FIG. 4 is a diagram illustrating an example of the overall operation processing flow performed by a client computer.

FIG. 4 is a diagram illustrating an example of the overall operation processing flow performed by the client computer shown in FIG. 3. First, the print setting section 11 performs print setting processing (step S1).

Figure 5:
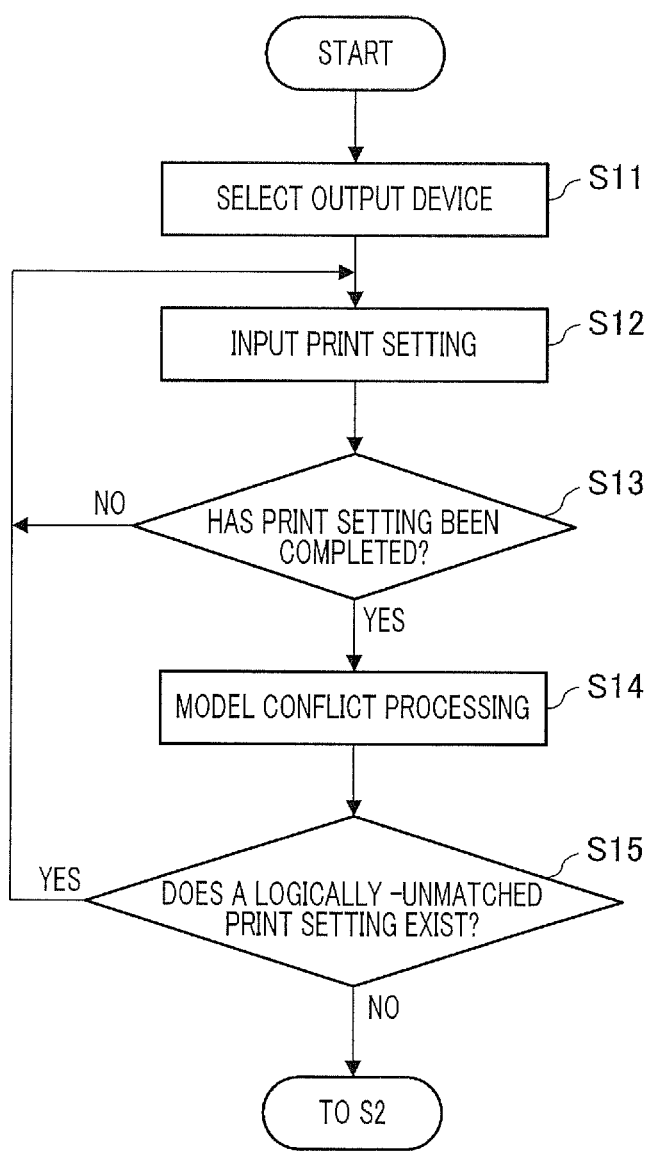
FIG. 5 is a diagram illustrating an example of print setting processing.

FIG. 5 is a diagram illustrating an example of print setting processing in step S1 shown in FIG. 4. First, the print setting section 11 displays a predetermined user interface (print setting input screen) for inputting a print setting.

Figure 6:
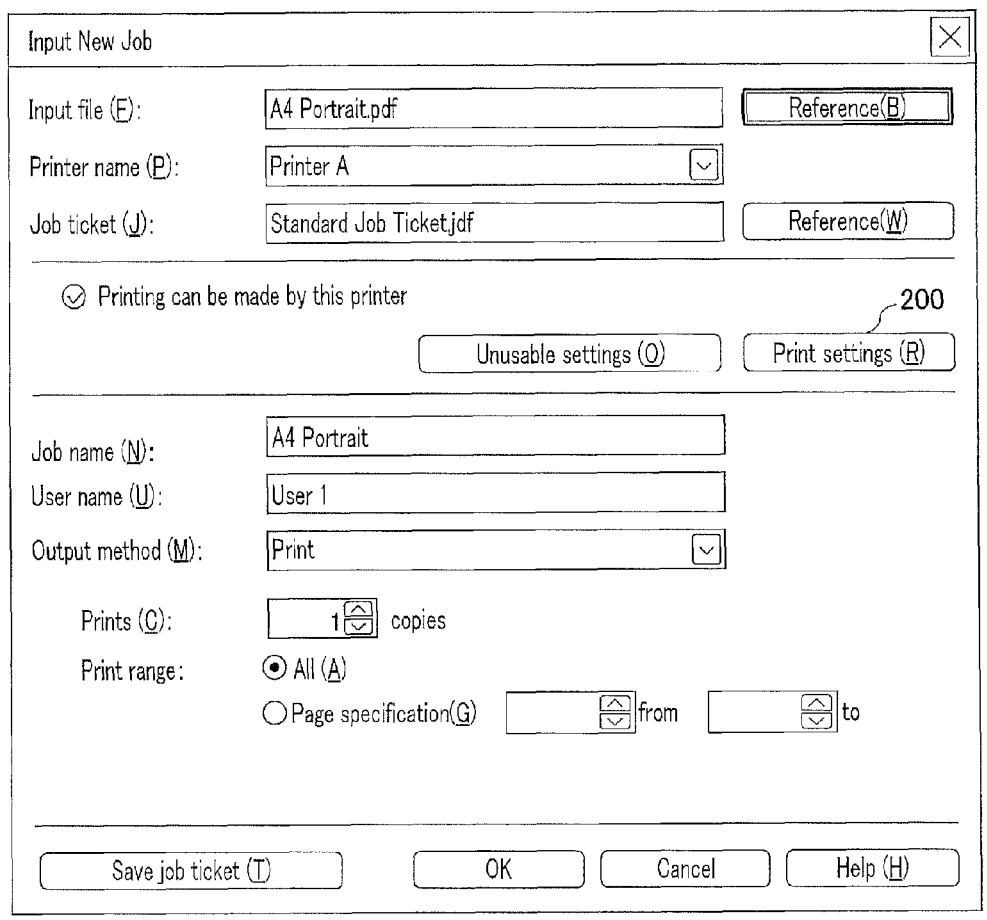
FIG. 6 is a diagram illustrating an example of a print setting input screen.

FIG. 6 is a diagram illustrating an example of a print setting input screen. When a user performs an input operation for print setting on a print setting input screen, the print setting section 11 inputs a print setting corresponding to the operation. A user may provide a global setting or an exception setting. The global setting is a print setting that is applied to the entire deliverable without limiting the page range to which the print setting is applied. The exception setting is a print setting that limits the page range and is applied only to the specified page range. Also, when a user selects a printer name on the print setting input screen shown in FIG. 6, the print setting section 11 selects the network printer 3 corresponding to the printer name as an output device. The output device is the network printer 3 that is the target of the printer job transmission by the client computer 1. When a user clicks a button described as "print settings (R)" within the print setting input screen shown in FIG. 6, the print setting section 11 displays a print setting input screen for the detailed print settings such as stapling, folding, punching, and the like.

Referring back to FIG. 5, the print setting section 11 selects an output device in accordance with a user's operation on the print setting input screen (step S11). Next, the print setting section 11 inputs a print setting in accordance with a user's operation on the print setting input screen (step S12). In step S12, the print setting section 11 functions as a print setting unit configured to perform a print setting (first print setting) for each of one or a plurality of second page ranges included in a first page range, i.e., the page range that is the target of print processing.

Next, the print setting section 11 determines whether or not the print setting has been completed (step S13). For example, when a user clicks the OK button on the print setting input screen shown in FIG. 6, the print setting section 11 determines that the print setting has been completed. When the print setting has not been completed, the process returns to step S12. When the print setting has been completed, the model conflict processing section 12 performs model conflict processing (step S14). Next, the print setting section 11 receives the model conflict processing result obtained by the model conflict processing section 12, and determines whether or not a logically-unmatched print setting has been detected based on the model conflict processing result (step S15). When a logically-unmatched print setting has been detected, the print setting section 11 displays a message for urging the resetting of the print setting, and the process returns to step S12. When a logically-unmatched print setting has not been detected, the print setting section 11 passes the print settings to the conflict confirmation job generating section 14, and the process advances to step S2 in FIG. 4.

Referring back to FIG. 4, the conflict confirmation job generating section 14 performs conflict confirmation job generating processing based on the print setting (e.g. first print setting) passed from the print setting section 11 (step S2).

Figure 7:
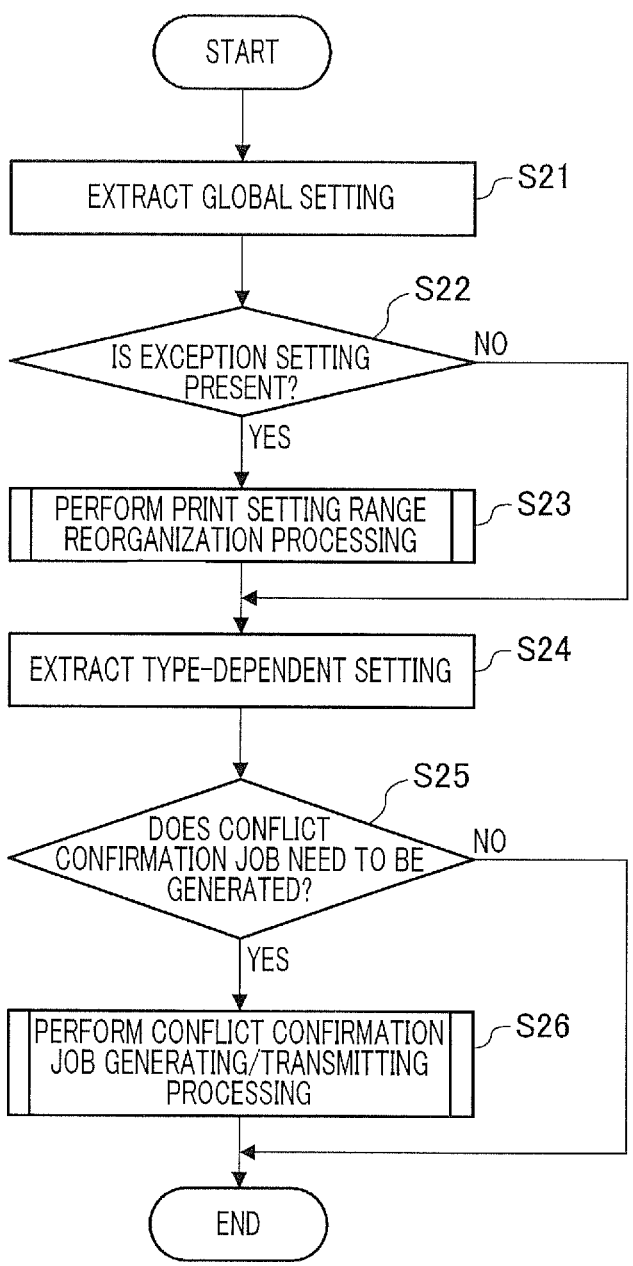
FIG. 7 is a diagram illustrating an example of conflict confirmation job generating processing.

FIG. 7 is a diagram illustrating an example of conflict confirmation job generating processing in step S2 shown in FIG. 4. First, the conflict confirmation job generating section 14 extracts a global setting from the print settings passed from the print setting section 11 (step S21). Next, the conflict confirmation job generating section 14 determines whether or not there is an exception setting in the print settings passed from the print setting section 11 (step S22). When an exception setting is absent, the process advances to step S24. When an exception setting is present, the conflict confirmation job generating section 14 performs print setting range reorganization processing (step S23). Print setting range reorganization processing is processing for reorganizing the relationship of correspondence between print settings and a page range.

Figure 8:
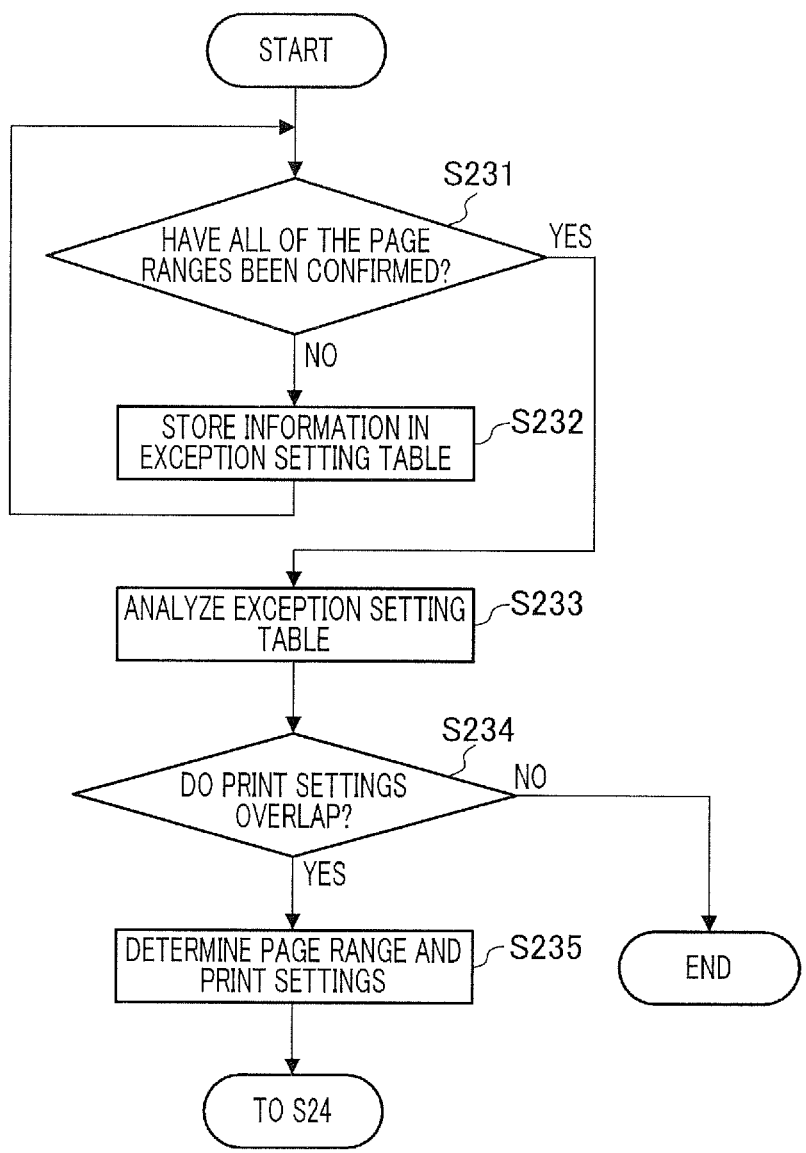
FIG. 8 is a diagram illustrating an example of print setting range reorganization processing.

FIG. 8 is a diagram illustrating an example of print setting range reorganization processing performed in step S23 in FIG. 7. The conflict confirmation job generating section 14 confirms print settings corresponding to the respective page ranges. The conflict confirmation job generating section 14 determines whether or not the print settings have been confirmed for all page ranges (step S231). When there is a page range for which the print settings have not been confirmed by the conflict confirmation job generating section 14, the conflict confirmation job generating section 14 stores information regarding the confirmed print settings and the page range to which the print settings are applied in an exception setting table (step S232). Then, the process returns to step S231. The exception setting table is a table that stores the corresponding information between print settings and a page range. The exception setting table is stored in a predetermined storage unit. When the conflict confirmation job generating section 14 confirms the print settings for the entire page ranges, the conflict confirmation job generating section 14 analyzes the exception setting table (step S233).

FIGS. 9A and 9B are diagrams illustrating examples of exception setting tables. The exception setting table has data items such as page number, global setting, exception setting, overlap setting counter, and the like. The data item "page number" is the number of a page to be subjected to print processing. In the example of the exception setting tables shown in FIGS. 9A and 9B, the page range from page 1 to page 13 is the page range (first page range) that is set for printing by the print setting section 11 and is to be subjected to print processing.

The data item "global setting" indicates the content of the global setting. The data item "exception setting" indicates the content of the exception setting. The data item "overlap setting counter" indicates the overlap number of the print settings corresponding to the respective pages. For example, for page 5 shown in FIG. 9A, "punching" in the global setting overlaps with "folding" in the exception setting 2. Hence, the conflict confirmation job generating section 14 sets the number of print settings overlapped to "1" in the overlap setting counter corresponding to the page. Also, for page 7, "punching" in the global setting overlaps with "stapling" in the exception setting 1 and "folding" in the exception setting 2. Hence, the conflict confirmation job generating section 14 sets the number of print settings overlapped to "2" in the overlap setting counter corresponding to the page. Also, the conflict confirmation job generating section 14 sets the overlap setting counter corresponding to a page with no print setting overlapped to "0".

The conflict confirmation job generating section 14 refers to the exception setting table shown in FIG. 9A, and confirms that the global setting (punching) has been made for the page range from page 1 to page 13. Also, the conflict confirmation job generating section 14 confirms that the exception setting 1 (stapling) has been made for the page range from page 7 to page 10. Further, the conflict confirmation job generating section 14 confirms that the exception setting 2 (folding) has been made for the page range from page 5 to page 8. In the example of the exception setting table shown in FIG. 9A, the page range from page 1 to page 13, the page range from page 7 to page 10, and the page range from page 5 to page 8 are second page ranges included in the first page range. The print setting corresponding to each of the second page ranges is the first print setting set by the print setting section 11.

Also, the conflict confirmation job generating section 14 refers to the exception setting table shown in FIG. 9B, and confirms that the global setting (punching) has been made for the page range from page 1 to page 13. Also, the conflict confirmation job generating section 14 confirms that the exception setting 1 (stapling) has been made for the page range from page 9 to page 10. Further, the conflict confirmation job generating section 14 confirms that the exception setting 2 (folding) has been made for the page range from page 5 to page 6. In the example of the exception setting table shown in FIG. 9B, the page range from page 1 to page 13, the page range from page 9 to page 10, and the page range from page 5 to page 6 are the second page ranges included in the first page range.

Next, the conflict confirmation job generating section 14 refers to the exception setting table, and determines whether or not the first print setting for each of the second page ranges overlaps (step S234). More specifically, when the set value of the overlap setting counter in the exception setting table is greater than 0, the conflict confirmation job generating section 14 determines that the first print setting for each of the second page ranges overlaps. When the set value of the overlap setting counter in the exception setting table is 0, the conflict confirmation job generating section 14 determines that the first print setting for each of the second page ranges does not overlap. When the first print setting for each of the second page ranges does not overlap, the process is ended. When the first print setting for each of the second page ranges overlaps, the conflict confirmation job generating section 14 determines a third page range and a second print setting, i.e., a print setting corresponding to the third page range (step S235), and the process advances to step S24 in FIG. 7.

A description will be given below of a third page range in step S235 and a method for determining a second print setting corresponding to the third page range. The conflict confirmation job generating section 14 determines a third page range by dividing the first page range based on a point at which the print setting corresponding to each page included in the first page range changes. The conflict confirmation job generating section 14 may divide the first page range based on a point at which the value of the overlap setting counter in the exception setting table shown in FIG. 9A changes. Consequently, a page range A from page 1 to page 4, a page range B from page 5 to page 6, a page range C from page 7 to page 8, and a page range D from page 9 to page 10 are determined to be third page ranges. In this example, since the page range from page 11 to page 13 has the same print setting content as that of the page range A, the conflict confirmation job generating section 14 does not set a third page range for the page range from page 11 to page 13. Also, the conflict confirmation job generating section 14 refers to the exception setting table, and, among the print settings set in the exception setting table, determines the print settings corresponding to the third page ranges as second print settings.

Figure 10:
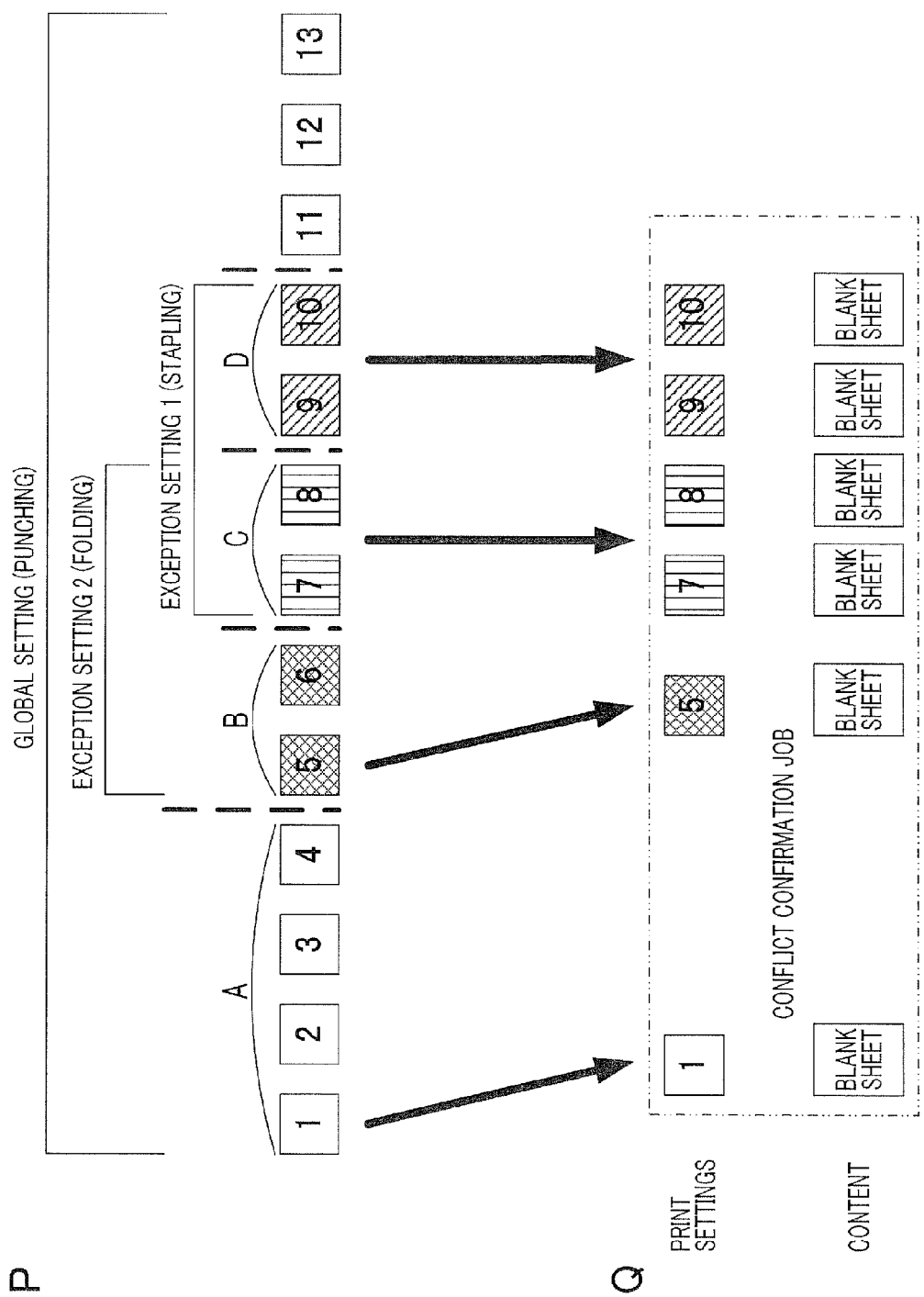
FIG. 10 is a diagram illustrating conflict confirmation job generating processing.

P of FIG. 10 is a diagram illustrating the respective third page ranges determined by the conflict confirmation job generating section 14. The conflict confirmation job generating section 14 sets the second print setting corresponding to the page range A as "punching". The conflict confirmation job generating section 14 sets the second print setting corresponding to the page range B as the combination of "punching" and "folding". The conflict confirmation job generating section 14 sets the second print setting corresponding to the page range C as the combination of "punching", "folding", and "stapling. The conflict confirmation job generating section 14 sets the second print setting corresponding to the page range D as the combination of "punching" and "stapling".

Figure 11:
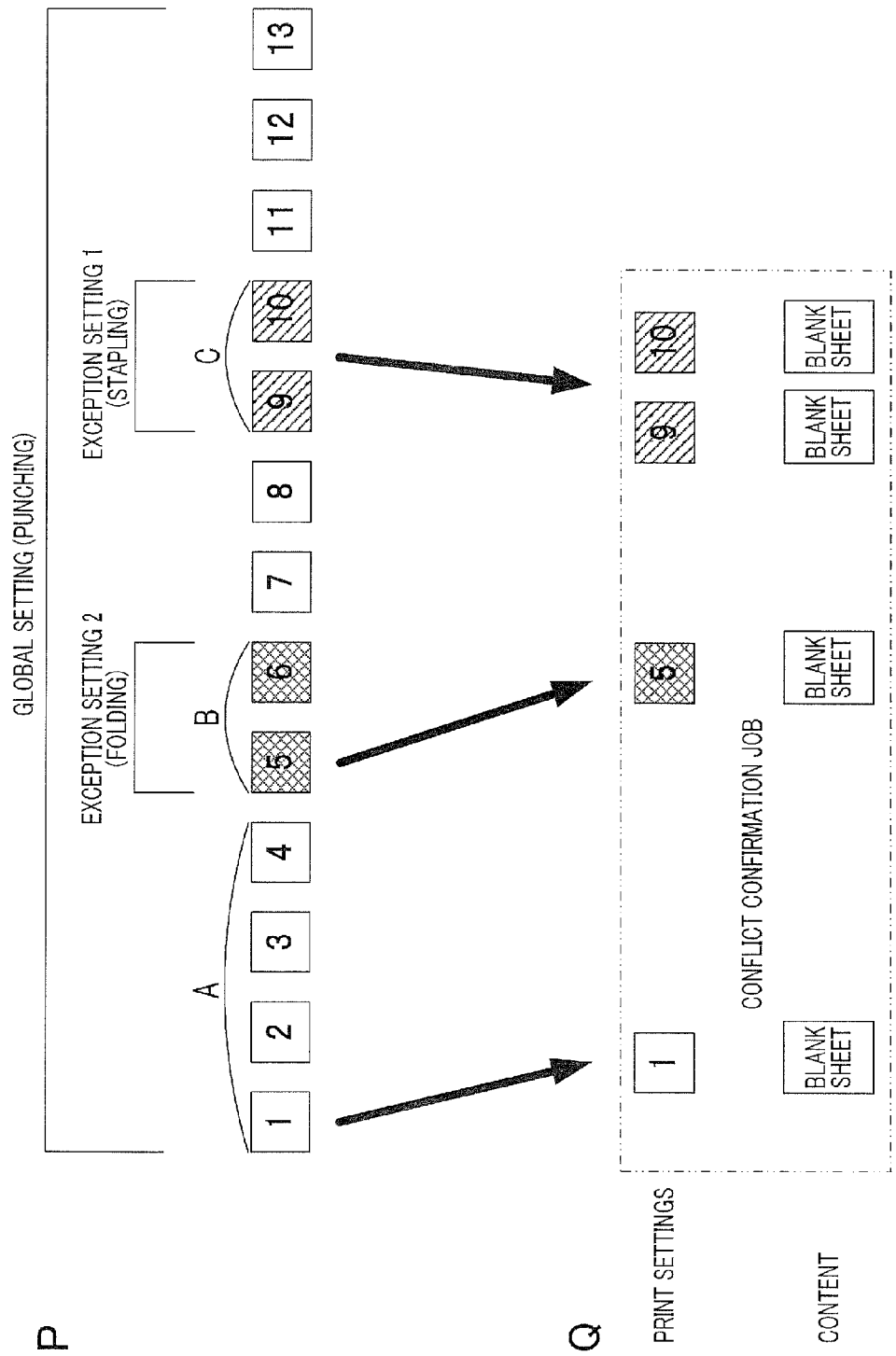
FIG. 11 is a diagram illustrating conflict confirmation job generating processing.

Likewise, the conflict confirmation job generating section 14 refers to the exception setting table shown in FIG. 9B, and the page range A from page 1 to page 4, the page range B from page 5 to page 6, and the page range C from page 9 to page 10 as third page ranges. P of FIG. 11 is a diagram illustrating the respective third page ranges determined by the conflict confirmation job generating section 14. Also, the conflict confirmation job generating section 14 sets the second print setting corresponding to the page range A as "punching". The conflict confirmation job generating section 14 sets the second print setting corresponding to the page range B as the combination of "punching" and "folding". The conflict confirmation job generating section 14 sets the second print setting corresponding to the page range C as the combination of "punching" and "stapling".

Referring back to FIG. 7, in step S24, the conflict continuation job generating section 14 performs type-dependent setting extraction processing (step S24). More specifically, from the second print settings determined in step S23 in FIG. 7, the conflict confirmation job generating section 14 selects a print setting including a print setting that depends on the type of the network printer 3 as a third print setting. Examples of a print setting that depends on the type of the network printer 3 include finishing setting and the like. A print setting that depends on the type of the network printer 3 is defined in advance. The selected third print setting is associated with the third page range corresponding to the second print setting from which the third print setting has been selected. When only the setting independent of the type of the network printer 3 (e.g., setting relating to monochrome printing) is included in the second print setting, the conflict confirmation job generating section 14 does not select the second print setting as a third print setting.

Next, the conflict confirmation job generating section 14 determines whether or not a conflict confirmation job needs to be generated (step S25). When a print setting including a print setting that depends on the type of the network printer 3 has been selected in step S24, the conflict confirmation job generating section 14 determines that a conflict confirmation job needs to be generated. When a print setting including a print setting that depends on the type of the network printer 3 has not been selected in step S24, the conflict confirmation job generating section 14 determines that a conflict confirmation job does not need to be generated. When a conflict confirmation job does not need to be generated, the process is ended. When a conflict confirmation job needs to be generated, the conflict confirmation job generating section 14 generates a conflict confirmation job, and transmits the conflict confirmation job to the network printer 3 via the data information transmitting/receiving section 15 and the print server 2 (step S26). In the present embodiment, the processes in step S24 and S25 shown in FIG. 7 may be omitted.

Figure 12:
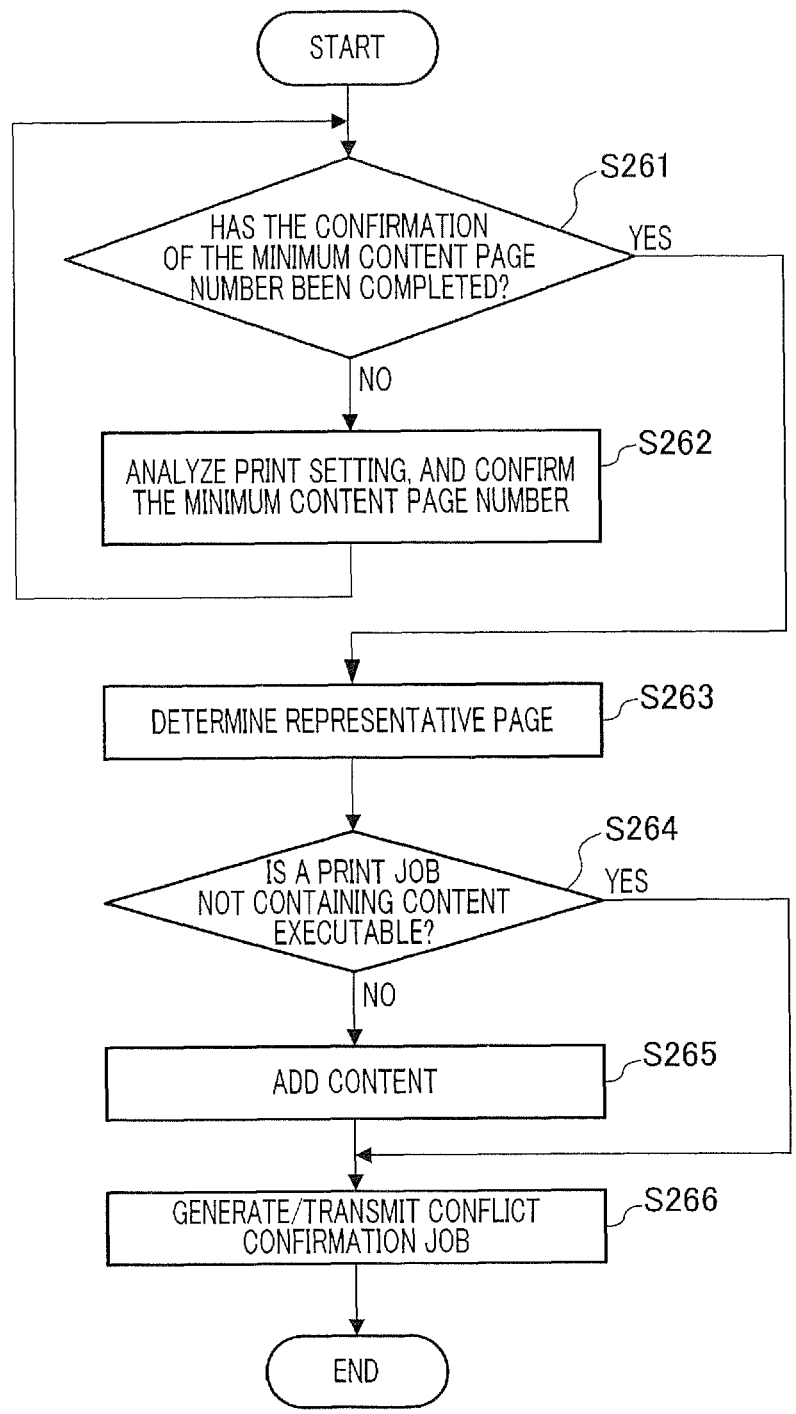
FIG. 12 is a flowchart illustrating conflict confirmation job generating/transmitting processing.

FIG. 12 is a flowchart illustrating conflict confirmation job generating/transmitting processing in step S26 in FIG. 7. The conflict confirmation job generating section 14 determines whether or not the confirmation of the minimum content page number for all of the third print settings has been completed (step S261). The minimum content page number is the minimum number of pages required for executing print jobs corresponding to the third print settings. The minimum content page number is predetermined. For example, the minimum content page number corresponding to "punching" is one page. Also, the minimum content page number corresponding to "stapling" is two pages. When there is a third print setting for which the confirmation of the minimum content page number has not been completed, the conflict confirmation job generating section 14 analyzes the third print setting and confirms the minimum content page number corresponding to the third print setting (step S262). Then, the process returns to step S261. When the confirmation of the minimum content page number for all of the third print settings has been completed, the process advances to step S263.

Next, the conflict confirmation job generating section 14 determines the representative page corresponding to the respective third print settings (step S263). The representative page is one or a plurality of pages included in the third page ranges. In step S263, among the pages included in the page ranges corresponding to the third print settings, the conflict confirmation job generating section 14 sets the pages for the minimum content page number corresponding to the third print settings confirmed in step S262 as the representative pages.

For example, as shown in Q of FIG. 10, the conflict confirmation job generating section 14 determines page 1 as the representative page corresponding to "punching". Also, the conflict confirmation job generating section 14 determines page 5 as the representative page corresponding to the combination of "punching" and "folding". Further, the conflict confirmation job generating section 14 determines page 7 and page 8 as the representative pages corresponding to the combination of "punching", "stapling", and "folding". Also, the conflict confirmation job generating section 14 determines page 9 and page 10 as the representative pages corresponding to the combination of "punching" and "stapling".

Also, for example, as shown in Q of FIG. 11, the conflict confirmation job generating section 14 determines page 1 as the representative page corresponding to "punching". Also, the conflict confirmation job generating section 14 determines page 5 as the representative page corresponding to the combination of "punching" and "folding". Further, the conflict confirmation job generating section 14 determines page 9 and page 10 as the representative pages corresponding to the combination of "punching" and "stapling".

When the minimum content page number corresponding to the third print setting is one page, the conflict confirmation job generating section 14 sets the leading pages among the pages included in the respective third page ranges as the representative page. With this arrangement, the relationship of correspondence between the pages and the representative pages included in the respective third page ranges can be clarified.

Referring back to FIG. 12, the conflict confirmation job generating section 14 determines whether or not the network printer 3 is capable of executing a print job not containing content (step S264). For example, the conflict confirmation job generating section 14 executes the process in step S264 based on the information, which is stored in a storage unit in advance, indicating whether or not the network printer 3 is capable of executing a print job not containing content. The conflict confirmation job generating section 14 may determine whether or not the network printer 3 is capable of executing a print job not containing content by providing a query to the network printer 3 via the network 4.

When the network printer 3 is capable of executing a print job not containing content, the conflict confirmation job generating section 14 generates a conflict confirmation job not containing content. More specifically, the conflict confirmation job generating section 14 generates a conflict confirmation job to which the print settings corresponding to the respective representative pages have been added. The print settings corresponding to the representative pages are print settings (third print settings) corresponding to the third page range from which the representative pages have been selected. Subsequently, the data information transmitting/receiving section 15 transmits the generated conflict confirmation job to the network printer 3 (step S266). The conflict confirmation job generating section 14 generates a conflict confirmation job not containing content, whereby the data amount of a conflict confirmation job to be generated can be reduced.

When the network printer 3 is not capable of executing a print job not containing content, the conflict confirmation job generating section 14 generates a conflict confirmation job to which a content has been added (step S265). More specifically, the conflict confirmation job generating section 14 generates a conflict confirmation job to which the print settings (third print settings) corresponding to each of the representative pages and blank content corresponding to each of the representative pages have been added. The blank content is a content not containing print data. More specifically, the conflict confirmation job generating section 14 adds a third print setting and the content of a representative page corresponding to the third print setting to a conflict confirmation job to be generated. Then, the data information transmitting/receiving section 15 transmits the generated conflict confirmation job to the network printer 3 (step S266). The region enclosed by the dashed lines shown in Q of FIG. 10 and Q of FIG. 11 is a diagram illustrating an example of a conflict confirmation job containing blank content. In the present embodiment, the pages of the minimum content page number of the third print setting are representative pages. Hence, the conflict confirmation job generating section 14 generates a conflict confirmation job containing the contents of the representative pages, whereby the conflict confirmation job generating section 14 can cause the network printer 3 to execute job processing for the minimum number of pages required for executing the third print setting.

In the present embodiment, when the processes in steps S24 and S25 in FIG. 7 are omitted, the processes in steps S261 to S263 and steps S265 and S266 are executed for the second print setting determined in step S237 in FIG. 8. Hence, when the processes in steps S24 and S25 in FIG. 7 are omitted, the conflict confirmation job generating section 14 adds, in step S265, the second print setting and its contents corresponding to the representative pages to a conflict confirmation job to be generated. This also applies to execution processing for a conflict confirmation job shown in FIG. 13 to be described below.

Figure 13:
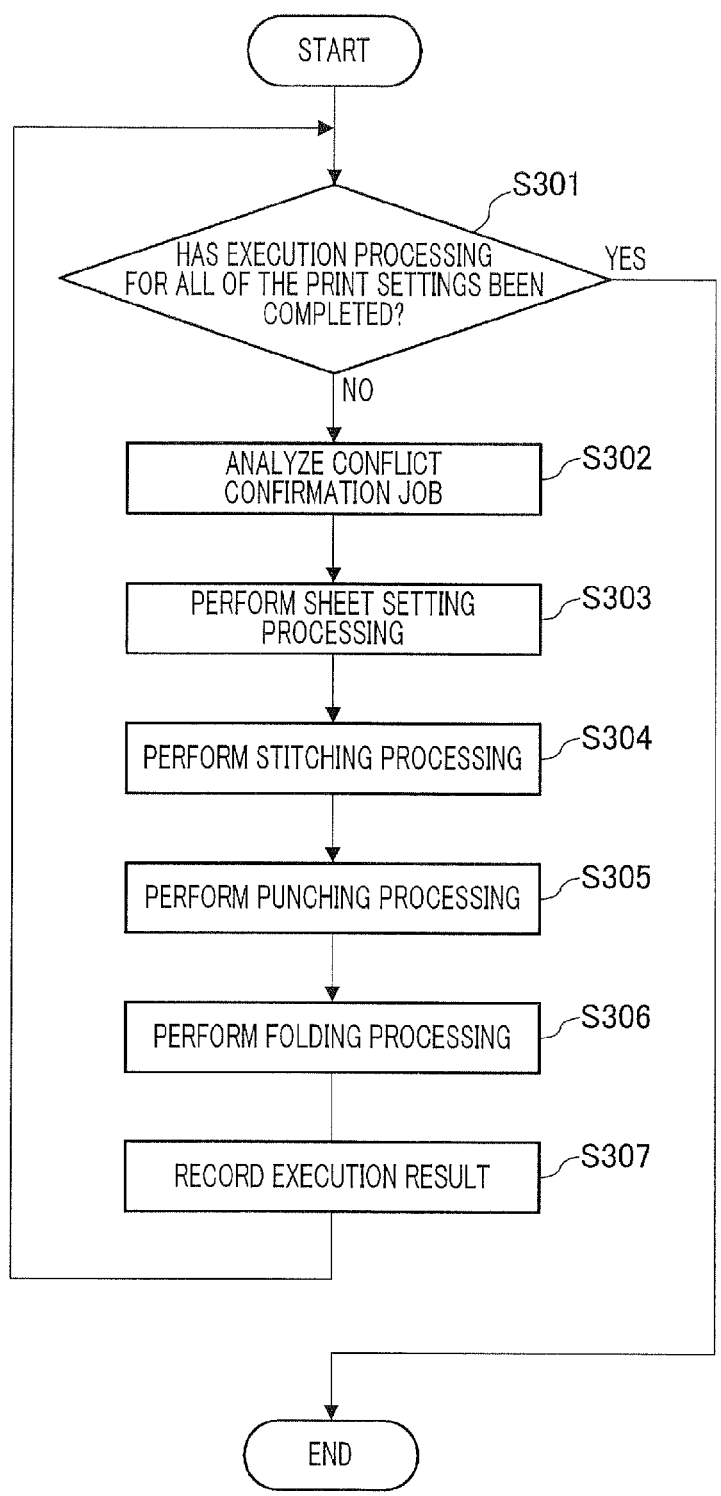
FIG. 13 is a diagram illustrating an example of the execution processing flow of a conflict confirmation job.

FIG. 13 is a diagram illustrating an example of the execution processing flow of a conflict confirmation job performed by a network printer. The printer control section 36 determines whether or not execution processing for all of the print settings (third print settings) included in a conflict confirmation job has been completed (step S301). When there is a print setting for which execution processing has not yet been completed, the process advances to step S302. The language analyzing section 32 analyzes the conflict confirmation job (step S302). When the language analyzing section 32 determines in step S302 that a content is required for executing job processing corresponding to the print settings, the rendering output section 34 may generate a blank content to pass it to the printer control section 36.

Next, in steps S303 to S306, the printer control section 36 executes job processing corresponding to the third print setting for each of the third print settings included in the conflict confirmation job. In the example shown in FIG. 13, the printer control section 36 executes job processing corresponding to the respective third print settings by executing sheet setting processing, stitching processing, punching processing, or folding processing. In the present embodiment, the printer control section 36 executes job processing in a known blank sheet saving mode. The contents included in the conflict confirmation job content are blank contents. Therefore, the printer control section 36 executes job processing in a blank sheet saving mode, whereby the execution result of the conflict confirmation job can be obtained without outputting any sheet of paper.

Next, the job managing section 33 records the execution result of the conflict confirmation job performed by the printer control section 36 (step S307), and the process returns to step S301. In step S307, the job managing section 33 records information indicating whether or not job processing corresponding to the respective print settings (third print settings) included in the respective print settings (third print settings) included in the conflict confirmation job could be executed as the execution result of the conflict confirmation job.

The execution result corresponding to the conflict confirmation job shown in Q of FIG. 10 will be specifically described below. For the third print settings composed of the combination of a plurality of print settings, the job managing section 33 determines information indicating whether or not job processing could be executed in the following manner. When the printer control section 36 could not execute at least one of the print settings included in the third print settings, the job managing section 33 contains information that indicates that job processing corresponding to the third print settings could not be executed in the execution result of the conflict confirmation job. For example, assume that the printer control section 36 could execute punching processing (first processing) applied to the representative page (page 1) and folding processing (second processing) applied to the representative page (page 5). Also, assume that the printer control section 36 could execute combination processing (third processing) of punching and stapling applied to the representative pages (pages 9 and 10). Further, assume that the printer control section 36 could not execute combination processing (fourth processing) of punching, stapling, and folding applied to the representative pages (pages 7 and 8). The job managing section 33 records information, which indicates that the first, second, and third processing could be executed and the fourth processing could not be executed, as the execution result of the conflict confirmation job.

When the printer control section 36 determines in step S301 that execution processing for all of the print settings (third print settings) included in the conflict confirmation job has been completed, the status response processing section 37 performs the following processing. The status response processing section 37 transmits status response information including the recorded execution result of the conflict confirmation job to the data information transmitting/receiving section 15 provided in the client computer 1 via the data information transmitting/receiving section 31 and the printer server 2, and then the process is ended.

Referring back to FIG. 4, when the data information transmitting/receiving section 15 provided in the client computer 1 receives status response information from the network printer 3, the conflict result determining section 16 executes conflict processing (step S3).

Figure 14:
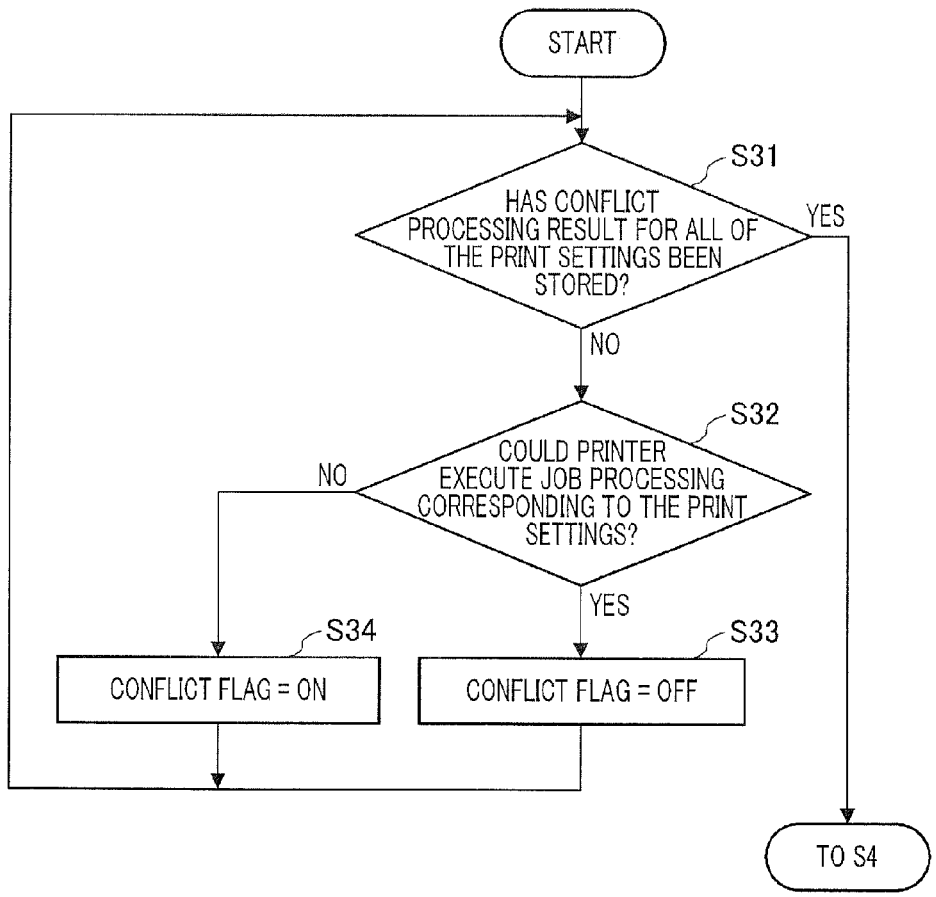
FIG. 14 is a diagram illustrating an example of conflict processing.

FIG. 14 is a diagram illustrating an example of conflict processing performed in step S3 in FIG. 4. The conflict result determining section 16 acquires the execution result of the conflict confirmation job included in the status response information. The conflict result determining section 16 determines whether or not the conflict processing result for all of the print settings (third print settings) included in the conflict confirmation job has been stored (step S31). When the conflict result determining section 16 stores the conflict processing result for all of the print settings included in the conflict confirmation job, the process advances to step S4 as shown in FIG. 4.

When there is a print setting for which the conflict processing result has not been stored, the process advances to step S33. In step S33, the conflict result determining section 16 refers to the execution result of the conflict continuation job, and determines whether or not the network printer 3 could execute job processing corresponding to the print settings included in the conflict confirmation job (step S32). More specifically, the conflict result determining section 16 detects the combination of the third print settings for which the network printer 3 cannot execute print processing (executes conflict processing).

When the network printer 3 could execute job processing corresponding to the print settings included in the conflict confirmation job, the conflict result determining section 16 performs the following processing. More specifically, the conflict result determining section 16 associates the print setting for which job processing could be executed by the network printer 3 with the representative page applied to the print setting, and sets a conflict flag to "OFF" (step S33). Next, the conflict result determining section 16 records the corresponding information among the conflict flag, the print setting, and the representative page as the conflict processing result in a predetermined storage unit, and the process returns to step S31. The conflict flag is a flag indicating whether or not the network printer 3 could execute job processing corresponding to the third print settings included in the conflict confirmation job. The conflict flag "ON" indicates the fact that the network printer 3 could not execute job processing corresponding to the third print settings included in the conflict confirmation job. The conflict flag "OFF" indicates the fact that the network printer 3 could execute job processing corresponding to the third print settings included in the conflict confirmation job.

When the network printer 3 could not execute job processing corresponding to the print settings included in the conflict confirmation job, the conflict result determining section 16 performs the following processing. More specifically, the conflict result determining section 16 associates the print setting for which job processing could not be executed by the network printer 3 with the representative page to which the print setting has been applied, and sets the conflict flag to "ON" (step S34). Then, the conflict result determining section 16 records the corresponding information among the conflict flag, the print setting, and the representative page as the conflict processing result in a predetermined storage unit, and the process returns to step S31.

For example, assume that the execution result corresponding to the conflict confirmation job shown in Q of FIG. 10 indicates that job processing for the print setting (the combination of "punching", "stapling", and "folding") to be applied to the representative pages (pages 7 and 8) could not be executed. The conflict result determining section 16 sets the conflict flag corresponding to the print setting to "ON".

Referring back to step S4 in FIG. 4, the print setting section 11 acquires the conflict processing result executed by the conflict result determining section 16. Next, based on the acquired conflict processing result, the print setting section 11 performs the following processing for each of the third print settings included in the conflict confirmation job. The print setting section 11 determines whether or not there is a print setting for which job processing could not be executed by the network printer 3 (whether or not a conflict exists) (step S4). When the conflict flag included in the conflict processing result is "ON", the print setting section 11 determines that a conflict exists. When the conflict flag included in the conflict processing result is "OFF", the print setting section 11 determines that no conflict exists. When the print setting section 11 determines that a conflict exists, the print setting section 11 displays the conflict (step S5), and the process returns to step S1. In step S5, the print setting section 11 displays, for example, information indicating the print setting that could not be executed by the network printer 3 and the page range corresponding to the print setting.

Figure 15:
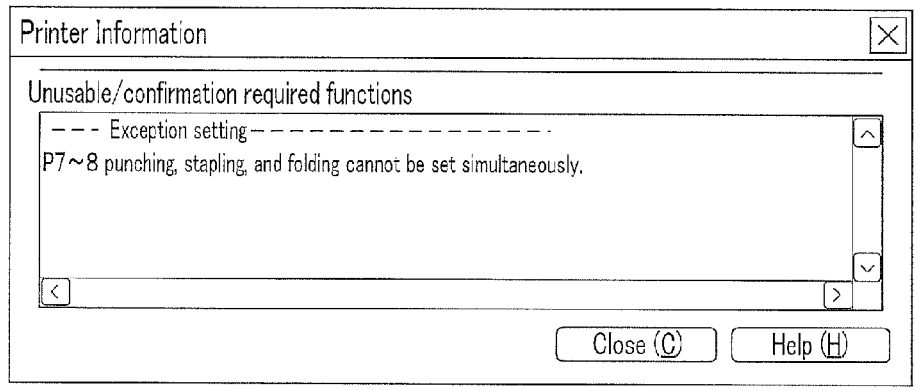
FIG. 15 shows an example of the display information indicating non-executable print setting.

The process in step S5 will be described more specifically. Assume that the print setting, for which it has been determined in step S4 that a conflict exists, is the combination of "punching", "stapling", and "folding" applied to the representative pages (pages 7 and 8) shown in Q of FIG. 10. Among the page ranges A to D shown in P of FIG. 10, the print setting section 11 specifies the page range C (pages 7 and 8) included in the representative pages. Then, for example, as shown in FIG. 15, the print setting section 11 displays a message, which indicates that the combination of "punching", "stapling", and "folding" cannot be executed, for the page range C specified by the network printer 3.

Referring back to FIG. 4, when the print setting section 11 determines in step S4 that no conflict exists, the process advances to step S6. In step S6, the print setting section 11 generates a print job to which the print setting that has been determined to have no conflict and the content corresponding to the print setting, that is, the content including print data which a user originally wishes to cause the network printer 3 to print, have been added. Next, the print setting section 11 transmits the generated print job to the network printer 3 via the data information transmitting/receiving section 15 and the print server 2. In this manner, the network printer 3 executes the print processing that a user originally wished to perform.

The information processing apparatus of the first embodiment transmits a conflict confirmation job, which has been generated based on a print setting to be printed, to a printing device, and performs conflict processing based on the execution result of the conflict confirmation job received from the printing device. Thus, according to the information processing apparatus of the first embodiment, any discrepancies between the print settings can be easily detected without including a module for avoiding any discrepancies between the print settings corresponding to the type of the printing device, based on the execution result of the conflict confirmation job performed by the printing device.

Also, when the print settings for a page range overlap, the information processing apparatus of the first embodiment newly reorganizes the relationship of correspondence between the page range and the print settings by dividing the page range to be subjected to print processing based on a point at which the print setting corresponding to each page changes (see FIG. 8). Then, the information processing apparatus generates a conflict confirmation job to which the print settings, in which the relationship of correspondence between the page ranges has been reorganized, have been added (see FIG. 12). Thus, according to the information processing apparatus of the first embodiment, even when many combination patterns exist for the print settings, a discrepancy between the print settings can be detected without exception.

Further, the information processing apparatus of the first embodiment generates a conflict confirmation job to which print settings including print settings that depend on the type of the network printer 3 have been added (see steps S24 to S26 in FIG. 7 and see FIG. 12). Thus, according to the information processing apparatus of the first embodiment, a discrepancy between print settings that depend on the type of the network printer 3 can be detected without exception.

Next, a description will be given of the second embodiment of the present invention. The overall operation processing flow performed by a client computer of the second embodiment is the same as the processing flow shown in FIG. 4. Hereinafter, among the operation processes performed by the client computer of the second embodiment, the following description deals mainly with the differences with the operation processes performed by the client computer of the first embodiment.

Figure 16:
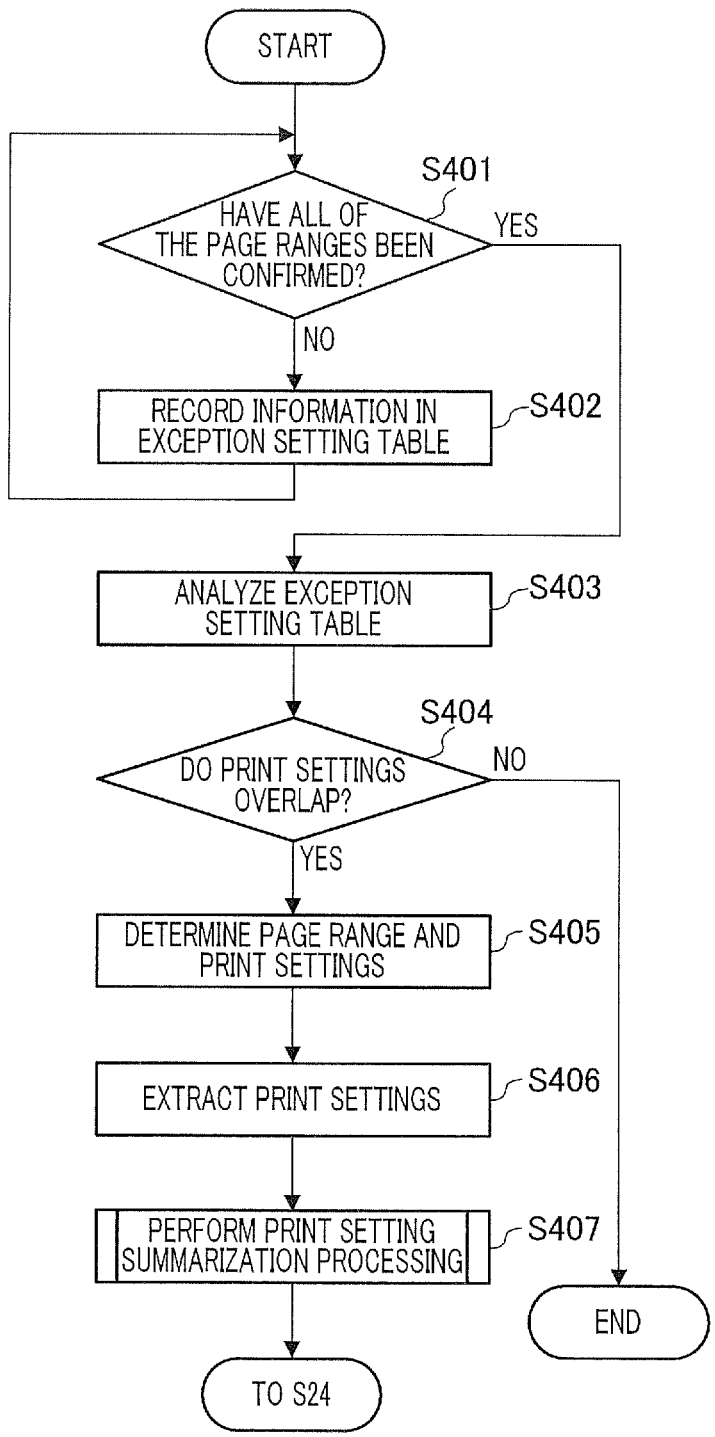
FIG. 16 is a diagram illustrating an example of print setting range reorganization processing.
Figure 19:
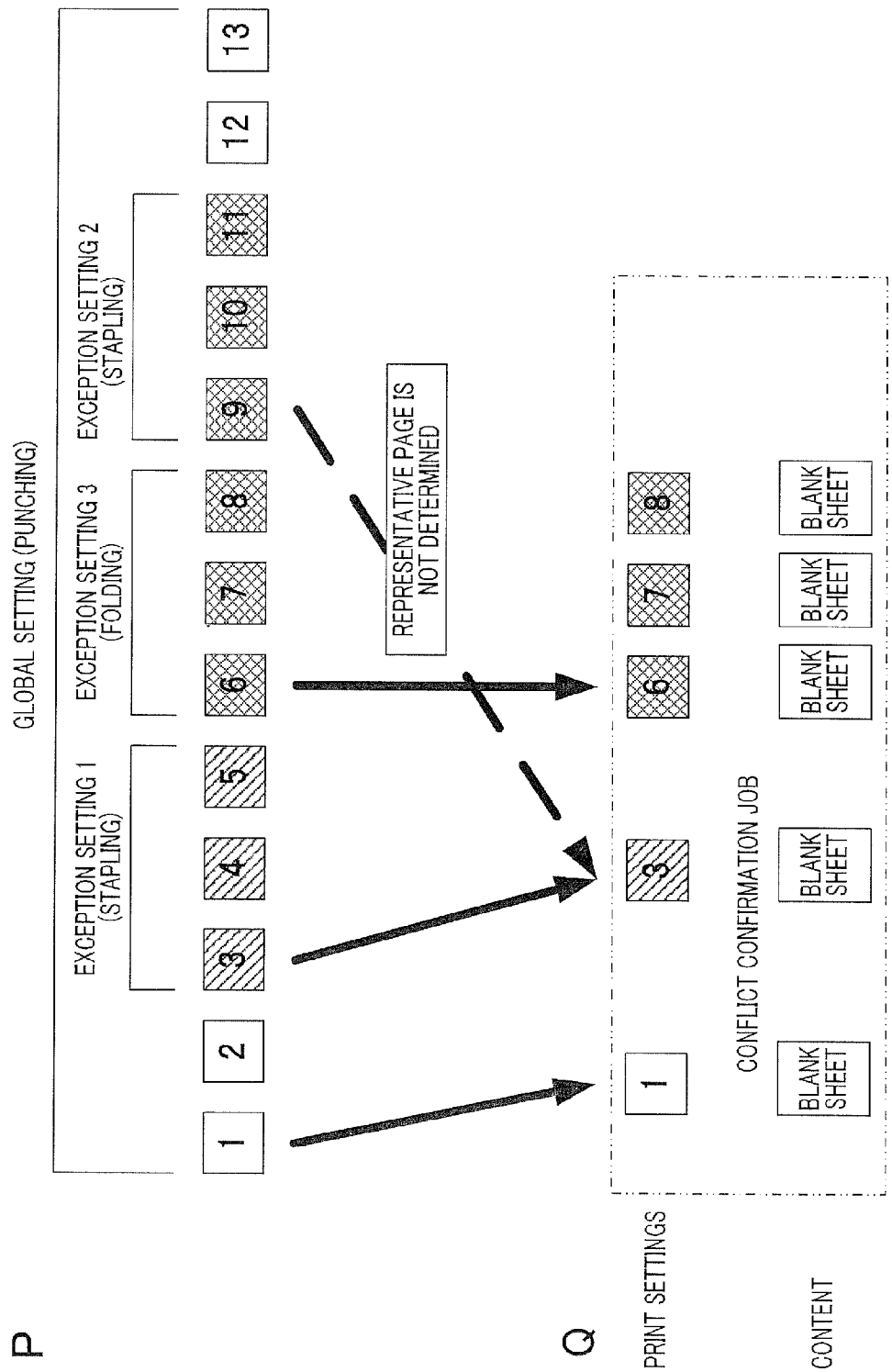
FIG. 19 is a diagram illustrating an example of print setting summarization processing.

FIG. 16 is a diagram illustrating an example of print setting range reorganization processing according to the second embodiment. The processes in steps S401 to S405 shown in FIG. 16 are the same as those in steps S231 to S235 shown in FIG. 8. In the second embodiment, in step S402 shown in FIG. 16, the conflict confirmation job generating section 14 stores, for example, an exception setting table as shown in FIG. 18 in a predetermined storage unit. The overlap flags in the exception setting table shown in FIG. 18 are the flags indicating that the print settings corresponding to the second page range shown in the exception setting table is the same as those corresponding to another second page range. In step S405 in FIG. 16, the conflict confirmation job generating section 14 determines a third page range and a second print setting corresponding to the third page range based on the exception setting table shown in FIG. 18. For example, four third page ranges from page 1 to page 2, from page 3 to page 5, from page 6 to page 8, and from page 9 to page 11 as shown in P of FIG. 19 are determined. Also, the second print setting corresponding to the third page range from page 1 to page 2 is determined as "punching". The second print setting corresponding to the third page range from page 3 to page 5 is determined as "stapling". The second print setting corresponding to the third page range from page 6 to page 8 is determined as "punching". And the second print setting corresponding to the third page range from page 9 to page 11 is determined as "stapling".

Referring back to FIG. 16, in step S406, the conflict confirmation job generating section 14 extracts the second print settings corresponding to the third page ranges, which have been determined in step S405 (step S406). Next, the conflict confirmation job generating section 14 executes print setting summarization processing (step S407), and the process advances to step S24 in FIG. 7.

Figure 17:
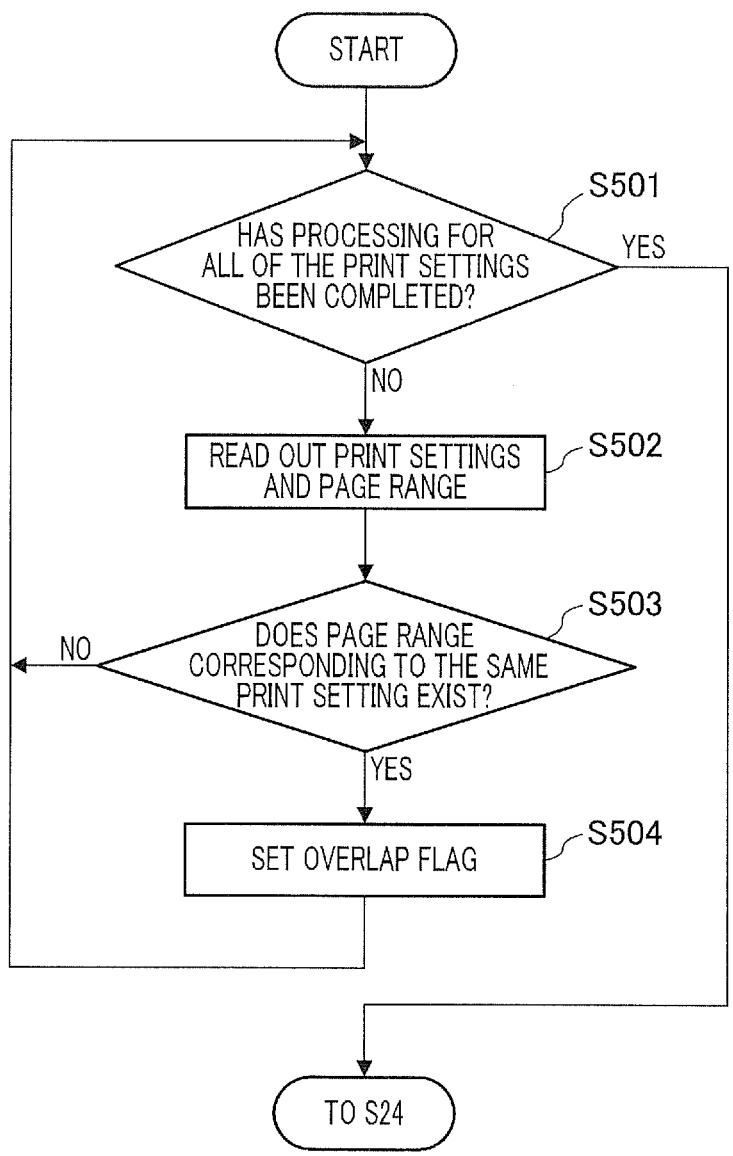
FIG. 17 is a flowchart illustrating print setting summarization processing.

FIG. 17 is a flowchart illustrating the print setting summarization processing performed in step S407 in FIG. 16. The conflict confirmation job generating section 14 determines whether or not processing for all of the second print settings extracted in step S406 in FIG. 16 has been completed (step S501). When processing for all of the extracted second print settings has been completed, the process advances to step S24 in FIG. 7.

When there is a second print setting for which processing has not been completed, the conflict confirmation job generating section 14 reads out information about a second print setting and a third page range corresponding to the second print setting (step S502). Next, the conflict confirmation job generating section 14 determines whether or not the third page ranges corresponding to the same second print setting exist (step S503). When no third page range corresponding to the same second print setting exists, the process returns to step S501. When the third page ranges corresponding to the same second print setting exist, the conflict confirmation job generating section 14 selects any one of the third page ranges from the third page ranges corresponding to the same second print setting. In the example shown in P of FIG. 19, the second print setting corresponding to the third page range from page 3 to page 5 is the same as that corresponding to the third page range from page 9 to page 11. Thus, the conflict confirmation job generating section 14 selects a third page range, for example, from page 3 to page 5. Next, the conflict confirmation job generating section 14 sets an overlap flag corresponding to the third page range, which has not been selected in the exception setting table (step S504), and the process returns to step S501.

In step S263 shown in FIG. 12, the conflict confirmation job generating section 14 according to the second embodiment does not determine a representative page from the third page range for which the overlap flags are set in the exception setting table. Thus, as shown in P and Q of FIG. 19, the conflict confirmation job generating section 14 does not determine a representative page from the third page range, for example, from page 9 to page 11. The conflict confirmation job generating section 14 determines page 3 included in the third page range from page 3 to page 5, which has been selected in step S503 in FIG. 17, as the representative page corresponding to the print setting of "stapling". Then, in step S265 shown in FIG. 12, the conflict confirmation job generating section 14 adds a third print setting (or second print setting) and its content corresponding to the representative page included in the selected third page range to a conflict confirmation job to be generated.

According to the information processing apparatus of the second embodiment, print settings included in a conflict confirmation job to be executed by the network printer 3 can be reduced, resulting in a reduction in a load imposed on the network printer 3.

According to the information processing apparatus of the present invention described above, any discrepancies between the print settings can be detected without including a module for avoiding any discrepancies between the print settings corresponding to the type of the printing device, based on the execution result of the conflict confirmation job performed by the printing device. Thus, according to the information processing apparatus of the present invention, a discrepancy between the print settings can be easily detected even when the printing devices of a plurality of types having different specification are employed or even when many combination patterns exist for the print settings.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-106214 filed May 6, 2010, which is hereby incorporated by reference herein in its entirety.

The invention claimed is:

1. An information processing apparatus that transmits a print job to which print settings have been added to a printing device to cause the printing device to execute print processing corresponding to the print settings, the information processing apparatus comprising:
    a print setting unit configured to set a global setting, which is a common print setting to all pages to be subjected to print processing, and an exception setting, which is a print setting different from the global setting for a specified page range;
    a generating unit configured to generate a conflict confirmation job used for conflict processing that is processing for detecting combinations of print settings by which the printing device is incapable of executing print processing, when a page range of a first exception setting overlaps a page range of a second exception setting, wherein the first exception setting and the second exception setting are set by the print setting unit;

a transmitting unit configured to transmit the generated conflict confirmation job to the printing device to cause the printing device to execute the conflict confirmation job;

a receiving unit configured to receive an execution result of the conflict confirmation job from the printing device; and a conflict processing executing unit configured to execute the conflict processing based on the execution result of the conflict confirmation job received by the receiving unit, wherein the generating unit generates the conflict confirmation job except for a page which is set to the same print setting as the print setting of a previous or a next page.

2. The information processing apparatus according to claim 1, wherein the generating unit determines a page range by dividing the page range of the global setting based on a point at which one of the print settings corresponding to a page included in the page range of the global setting changes and a print setting corresponding to the determined page range, and adds the print setting and a content corresponding to one or a plurality of representative pages included in each of the determined page range to the conflict confirmation job to be generated.

3. The information processing apparatus according to claim 2, wherein the generating unit determines whether or not page ranges corresponding to the same print setting exist, and, when the page ranges corresponding to the same print setting exist, the generating unit adds the print setting and the content corresponding to the representative page included in any one of the page ranges among the page ranges corresponding to the same print setting to the conflict confirmation job to be generated.

4. The information processing apparatus according to claim 2, wherein the generating unit selects a print setting that depends on the type of the printing device from the print settings, and adds the selected print setting and the content of the representative page corresponding to the print setting to the conflict confirmation job to be generated.

5. The information processing apparatus according to claim 2, wherein the generating unit sets a leading page among the pages included in the respective page ranges corresponding to the print setting as the representative page.

6. The information processing apparatus according to claim 2, wherein the generating unit sets a predetermined number of pages required for executing a print job corresponding to the print setting as the representative pages corresponding to the print setting.

7. The information processing apparatus according to claim 2, wherein the content is blank.

8. The information processing apparatus according to claim 2, wherein the generating unit determines whether or not the printing device is capable of executing a print job not containing content, and, when the printing device is capable of executing a print job not containing content, generates a conflict confirmation job not containing content.

9. A method for controlling an information processing apparatus that transmits a print job to which print settings have been added to a printing device to cause the printing device to execute print processing corresponding to the print settings, the method comprising:

setting a global setting, which is a common print setting to all pages to be subjected to print processing, and setting an exception setting, which is a print setting different from the global setting for a specified page range;

generating a conflict confirmation job used for conflict processing that is processing for detecting combinations of print settings by which the printing device is incapable of executing print processing, when a page range of a first exception setting overlaps a page range of a second exception setting, wherein the first exception setting and the second exception setting are set by a print setting step;

transmitting the generated conflict confirmation job to the printing device to cause the printing device to execute the conflict confirmation job;

receiving an execution result of the conflict confirmation job from the printing device; and executing the conflict processing based on the execution result of the conflict confirmation job received by the receiving unit, wherein the conflict confirmation job is generated except for a page which is set to the same print setting as the print setting of a previous or a next page.

10. A non-transitory computer-readable storage medium storing a program causing a computer to execute a method for controlling an information processing apparatus that transmits a print job to which print settings have been added to a printing device to cause the printing device to execute the print processing corresponding to the print setting, wherein the program causes the computer to execute:

a print setting step of setting a global setting, which is a common print setting to all pages to be subjected to print processing, and an exception setting, which is a print setting different from the global setting for a specified page range;

generating a conflict confirmation job used for conflict processing that is processing for detecting combinations of print settings by which the printing device is incapable of executing print processing, when a page range of a first exception setting overlaps a page range of a second exception setting, wherein the first exception setting and the second exception setting are set by the print setting step;

transmitting the generated conflict confirmation job to the printing device to cause the printing device to execute the conflict confirmation job;

receiving an execution result of the conflict confirmation job from the printing device; and executing the conflict processing based on the execution result of the conflict confirmation job received by the receiving step, wherein the conflict confirmation job is generated except for a page which is set to the same print setting as the print setting of a previous or a next page.

* * * * *